(12) United States Patent
Nishino et al.

(10) Patent No.: US 11,499,025 B2
(45) Date of Patent: Nov. 15, 2022

(54) PREPREG MANUFACTURING METHOD AND MANUFACTURING APPARATUS

(71) Applicant: Toray Industries, Inc., Tokyo (JP)

(72) Inventors: So Nishino, Otsu (JP); Yoshikazu Kono, Ehime (JP); Takashi Ochi, Ehime (JP); Junichi Aoki, Ehime (JP); Yoshiyuki Kitamura, Otsu (JP); Kiyoshi Minoura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 21 days.

(21) Appl. No.: 17/266,680

(22) PCT Filed: Aug. 20, 2019

(86) PCT No.: PCT/JP2019/032495
§ 371 (c)(1),
(2) Date: Feb. 8, 2021

(87) PCT Pub. No.: WO2020/040153
PCT Pub. Date: Feb. 27, 2020

(65) Prior Publication Data
US 2022/0112344 A1 Apr. 14, 2022

(30) Foreign Application Priority Data

Aug. 22, 2018 (JP) .............................. JP2018-155068
Aug. 22, 2018 (JP) .............................. JP2018-155076

(51) Int. Cl.
*B29B 15/12* (2006.01)
*C08J 5/24* (2006.01)
*C08L 63/04* (2006.01)

(52) U.S. Cl.
CPC ............. *C08J 5/243* (2021.05); *B29B 15/122* (2013.01); *C08L 63/04* (2013.01)

(58) Field of Classification Search
CPC ......... C08L 63/04; B29B 15/122; C08J 5/243
See application file for complete search history.

(56) References Cited

U.S. PATENT DOCUMENTS 9,238,336 B2  1/2016  Ishibashi et al.
9,410,004 B2  8/2016  Asano et al.
(Continued)

FOREIGN PATENT DOCUMENTS

CN  101913253 A  12/2010
JP  4930453 A  3/1974
(Continued)

OTHER PUBLICATIONS

International Search Report and Written Opinion for International Application No. PCT/JP2019/032495, dated Nov. 12, 2019, 7 pages.
(Continued)

*Primary Examiner* — Vishal I Patel
(74) *Attorney, Agent, or Firm* — RatnerPrestia

(57) ABSTRACT

The present invention provides an apparatus for producing a prepreg, for applying a coating liquid to a reinforcing fiber sheet, the apparatus including: a coating section including: a liquid pool storing the coating liquid and having a portion whose cross-sectional area decreases continuously and vertically downward, and a narrowed section having a slit-like outlet in communication with the lower end of the liquid pool; a running mechanism for allowing the reinforcing fiber sheet to run vertically downward and be introduced into the coating section; a take-up mechanism for taking up the reinforcing fiber sheet downward from the coating section; wall constituent members opposed to each other in the thickness direction of the reinforcing fiber sheet to form the narrowed section; and an external force application mecha-
(Continued)

nism for applying an external force to the wall constituent members in the thickness direction of the reinforcing fiber sheet.

14 Claims, 14 Drawing Sheets

(56) References Cited

U.S. PATENT DOCUMENTS

| | | | |
|---|---|---|---|
| 9,434,811 B2 | 9/2016 | Arai et al. | |
| 2006/0087059 A1* | 4/2006 | Boissonnat | B29C 48/15 264/555 |
| 2014/0175694 A1* | 6/2014 | Mizuta | B29B 11/16 264/136 |
| 2016/0303777 A1 | 10/2016 | Miyauchi et al. | |
| 2018/0043530 A1 | 2/2018 | Prins et al. | |

FOREIGN PATENT DOCUMENTS

| | | |
|---|---|---|
| JP | 01104624 A | 4/1989 |
| JP | 01178411 A | 7/1989 |
| JP | 01178412 A | 7/1989 |
| JP | 0631821 A | 2/1994 |
| JP | 2000000896 A | 1/2000 |
| JP | 2011132389 A | 7/2011 |
| JP | 2013022868 A | 2/2013 |
| JP | 2015022799 A | 2/2015 |
| JP | 2016203397 A | 12/2016 |
| JP | 2017154330 A | 9/2017 |
| JP | 2018507801 A | 3/2018 |
| WO | 0128951 A2 | 4/2001 |
| WO | 2005002819 A2 | 1/2005 |
| WO | 2007062516 A1 | 6/2007 |
| WO | 2009142231 A1 | 11/2009 |
| WO | 2010150022 A1 | 12/2010 |
| WO | 2011118106 A1 | 9/2011 |
| WO | 2012002417 A1 | 1/2012 |
| WO | 2013038521 A1 | 3/2013 |
| WO | 2015060299 A1 | 4/2015 |
| WO | 2015076981 A1 | 5/2015 |
| WO | 2017068159 A1 | 4/2017 |

OTHER PUBLICATIONS

Kawabe, K., "New Spreading Technology for Carbon Fiber Tow and Its Application to Composite Materials", Sen'i Gakkaishi, vol. 64, No. 8, 2008, pp. 262-267.

Extended European Search Report for European Application No. 19 852 854.9, dated Apr. 8, 2022, 7 pages.

* cited by examiner

PREPREG MANUFACTURING METHOD AND MANUFACTURING APPARATUS

CROSS REFERENCE TO RELATED APPLICATIONS

This is the U.S. National Phase application of PCT/JP2019/032495, filed Aug. 20, 2019, which claims priority to Japanese Patent Application No. 2018-155068, filed Aug. 22, 2018 and Japanese Patent Application No. 2018-155076, filed Aug. 22, 2018, the disclosures of each of these applications being incorporated herein by reference in their entireties for all purposes.

FIELD OF THE INVENTION

The present invention relates to a method and apparatus for producing a prepreg, and particularly relates to a method and apparatus for providing and impregnating a reinforcing fiber sheet with a coating liquid uniformly.

BACKGROUND OF THE INVENTION

Fiber reinforced composite materials (FRP) in which a matrix resin containing a thermoplastic resin or a thermosetting resin is reinforced with a reinforcing fiber are used in various fields such as aerospace materials, automobile materials, industrial materials, pressure vessels, construction materials, housings, medical applications, and sports applications. Carbon fiber reinforced materials (CFRP) are widely and suitably used particularly in cases where a high mechanical property and lightness are required. On the other hand, in some of the cases where cost has priority over a mechanical property and lightness, glass fiber reinforced composite materials (GFRP) are used. FRP is obtained by impregnating a reinforcing fiber bundle with a matrix resin to obtain an intermediate base material, which is laminated and formed, and further thermally cured if a thermosetting resin is used, and members composed of FRP are then produced. In the above-mentioned applications, planar objects or objects formed by folding planar objects are often used, and two-dimensional sheet-like objects are more widely used as intermediate base materials of FRP than one-dimensional strands and roving-like objects, from the viewpoint of lamination efficiency and moldability achieved in producing such members.

In addition, an attempt to enhance production efficiency for members composed of FRP has recently promoted the mechanization and automation of lamination of sheet-like intermediate base materials, and here, narrow tape-like intermediate base materials are suitably used. Narrow tape-like intermediate base materials can be obtained by slicing broad sheet-like intermediate base materials into tapes having a desired width or impregnating a narrow reinforcing fiber sheet directly with matrix resins.

As two-dimensional sheet-like intermediate base materials, prepregs obtained by impregnating reinforcing fiber sheets with matrix resins are widely used. Examples of reinforcing fiber sheets to be used for prepregs include: a unidirectional material (UD base material) in which a plurality of reinforcing fibers are unidirectionally arranged in planar form; and a reinforcing fiber fabric formed by arranging reinforcing fibers multiaxially or randomly into a sheet. The unidirectional materials (UD base materials) are often used particularly in cases where the mechanical property has priority.

A hot-melt process that is one of the methods of producing prepregs is a method in which a matrix resin is melted and then applied onto release paper sheets, a laminated structure is produced in which a reinforcing fiber sheet is sandwiched between the matrix resin sheets at the upper side and lower side of the reinforcing fiber sheet, and then, the inside of the reinforcing fiber sheet is impregnated with the matrix resin by heat and pressure. There is a problem in that this method has many steps, cannot increase the production speed, and is costly.

For more efficient impregnation, for example, Patent Literature 1 has made a proposition. This is a method in which glass fiber is melted and spun, and the resulting spinning bundled in strand form or roving form is allowed to pass through a liquid pool filled with a thermoplastic resin and having a conical flow path.

As a method of producing strip-like prepreg using a thermoplastic resin, a horizontal type pultrusion method is known in which a strip-like reinforcing fiber bundle is conveyed in the horizontal direction (cross direction) and is allowed to pass through a die, where the strip-like reinforcing fiber bundle is provided and impregnated with a thermoplastic resin (Patent Literature 2 and Patent Literature 3). According to Patent Literature 2, a tape-like reinforcing fiber is allowed to pass through a crosshead (in FIG. 2 in Patent Literature 2), and the tape-like reinforcing fiber bundle is provided with a resin immediately before a linear die in the crosshead. Patent Literature 3 explains that a plurality of strip-like reinforcing fiber bundles are separately introduced into a die filled with molten thermoplastic resin, opened, impregnated, and laminated using a fixed guide (for example, a squeeze bar), and finally withdrawn from the die as one sheet of prepreg.

Patent Literature 4 describes a device that causes ultrasonic vibration at the outlet of a manifold in a pultrusion method in which the manifold is filled with a thermoplastic resin, and a reinforcing fiber bundle is pultruded longitudinally from the manifold. In addition, FIG. 2 in Patent Literature 4 describes an adjusting bolt that allows a die lip to be movable, thus enabling the gap of the outlet (die slit) to be adjusted.

PATENT LITERATURE

Patent Literature 1: WO2001/028951A1
Patent Literature 2: JP06-031821A
Patent Literature 3: WO2012/002417A1
Patent Literature 4: JP01-178412A

SUMMARY OF THE INVENTION

However, the method in Patent Literature 1 enables only a strand-like or roving-like object to be produced, and is not applicable to producing a sheet-like prepreg at which the present invention is directed. In addition, Patent Literature 1 explains that, in order to enhance impregnation efficiency, a thermoplastic resin fluid is allowed to strike against a side of the strand-like or roving-like reinforcing fiber bundle to actively generate turbulence in a conical flow path. This is considered to be intended to disturb part of the arrangement of the reinforcing fiber bundle so that the matrix resin can flow in, but applying this idea to a reinforcing fiber sheet conceivably causes the arrangement of the reinforcing fiber bundle to be disturbed, resulting in not only degrading the grade of the prepreg but also decreasing the mechanical property of FRP.

According to the technology of Patent Literature 2, a tape-like reinforcing fiber passes through a slit-like guider chip with no resin in the fore portion of a die in a crosshead, and accordingly, the fore portion is more likely to be clogged with fuzz and also has no function for removing the fuzz, conceivably making it difficult to run the tape-like reinforcing fiber continuously for a long time. This tendency is considered to be remarkable particularly with carbon fiber, which is more likely to generate fuzz.

In addition, the method of Patent Literature 3 makes it more likely that fuzz is retained in a liquid pool during continuous production and that the fuzz clogs a pultrusion portion. There is a problem in that, in particular, running a strip-like reinforcing fiber bundle continuously at a high speed causes the frequency of clogging with fuzz to be very high, and accordingly, enables production to be carried out only at a very low speed and fails to increase productivity. In addition, a horizontal type pultrusion method makes it necessary to seal the die hermetically to prevent liquid leakage and makes it insufficient to collect fuzz during continuous production. Furthermore in the horizontal type pultrusion method, impregnating the inside of a reinforcing fiber sheet with a coating liquid causes bubbles remaining in the strip-like reinforcing fiber bundle to be discharged, by ascending force, in the direction perpendicular to the orientation direction of the reinforcing fiber bundle (in the thickness direction of the strip-like reinforcing fiber bundle), and accordingly, the discharge of the bubbles progresses in such a manner that the bubbles push away the coating liquid in-coming for impregnation. Because of this, there is a problem in that not only the movement of the bubbles is inhibited by the coating liquid, but also the impregnation with the coating liquid is inhibited by the bubbles, resulting in low impregnation efficiency. In this regard, Patent Literature 3 also proposes exhausting bubbles through a vent, but the exhaustion takes place only near the outlet of a die, and the effect of the exhaustion is considered to be limitative.

In a method described in Patent Literature 4, a nozzle portion filled with no resin is disposed in the portion above a manifold. The nozzle can be optimized with a strand or a roving-form object but does not easily cope with a planar shape such as of a reinforcing fiber sheet. While passing through this nozzle, a reinforcing fiber sheet generates fuzz, which is conceivably more likely to clog a die when brought into the manifold.

In addition, none of Patent Literature 2 to 4 in which a sheet-like base material is coated using a die gives consideration to the die deformation and coating ununiformity which are caused by a liquid pressure at which a coating liquid is pushed out through the tip of the die.

Thus, an efficient method of applying a coating liquid to a reinforcing fiber sheet, particularly an efficient method of producing a sheet-like prepreg which is uniformly impregnated up to the inside thereof with a coating liquid has not been established yet.

An object of the present invention relates to a method of producing a prepreg, and is to provide a method and apparatus for producing a prepreg, wherein generation of fuzz is suppressed, continuous production is possible without clogging with fuzz, a reinforcing fiber sheet is uniformly provided and efficiently impregnated with a coating liquid, and the production speed can be made higher.

An apparatus for producing a prepreg according to embodiments of the present invention for solving the above-mentioned problems is an apparatus for producing a prepreg, for applying a coating liquid to a reinforcing fiber sheet, the apparatus characterized by including:
   a coating section including:
      a liquid pool storing the coating liquid and having a portion whose cross-sectional area decreases continuously and vertically downward, and
      a narrowed section having a slit-like outlet in communication with the lower end of the liquid pool;
   a running mechanism for allowing the reinforcing fiber sheet to run vertically downward and be introduced into the coating section; and
   a take-up mechanism for taking up the reinforcing fiber sheet downward from the coating section;
   wherein the narrowed section is formed with wall constituent members opposed to each other in the thickness direction of the reinforcing fiber sheet, and
   wherein the apparatus further has an external force application mechanism for applying an external force to the wall constituent members in the thickness direction of the reinforcing fiber sheet.

In addition, a method of producing a prepreg according to embodiments of the present invention is a method of producing a prepreg for applying a coating liquid to a reinforcing fiber sheet, the method characterized by including allowing a reinforcing fiber sheet to pass vertically downward through a coating section to apply a coating liquid,
   wherein the coating section includes:
      a liquid pool storing the coating liquid and having a portion whose cross-sectional area decreases continuously and vertically downward, and
      a narrowed section having a slit-like outlet in communication with the lower end of the liquid pool; and
   wherein the coating liquid is applied with the help of controlling the magnitude of an external force applied to wall constituent members in the thickness direction of the reinforcing fiber sheet,
      wherein the magnitude is controlled on the basis of the mass or thickness of the prepreg downstream of the coating section, and
      wherein the wall constituent members are opposed to each other in the thickness direction of the reinforcing fiber sheet to form the narrowed section.

The method and apparatus for producing a prepreg according to the present invention make it possible to significantly suppress and prevent clogging with fuzz. Furthermore, the method and apparatus enable the reinforcing fiber sheet to be run continuously at a high speed, and enhance the productivity of the reinforcing fiber sheet having a coating liquid applied thereto. Furthermore, the method and apparatus make it possible to apply a coating liquid to a reinforcing fiber sheet uniformly in the width direction and running direction of the reinforcing fiber sheet and to obtain the reinforcing fiber sheet uniformly impregnated up to the inside thereof with the coating liquid.

DETAILED DESCRIPTION OF EMBODIMENTS OF THE INVENTION

Preferred embodiments of the present invention will be described below. In this regard, the following description illustrates embodiments of the present invention, the present invention is not to be construed to be limited to the embodiments, and various modifications can be made to the invention to the extent that they do not depart from the object and effect of the present invention.

Figure 1:
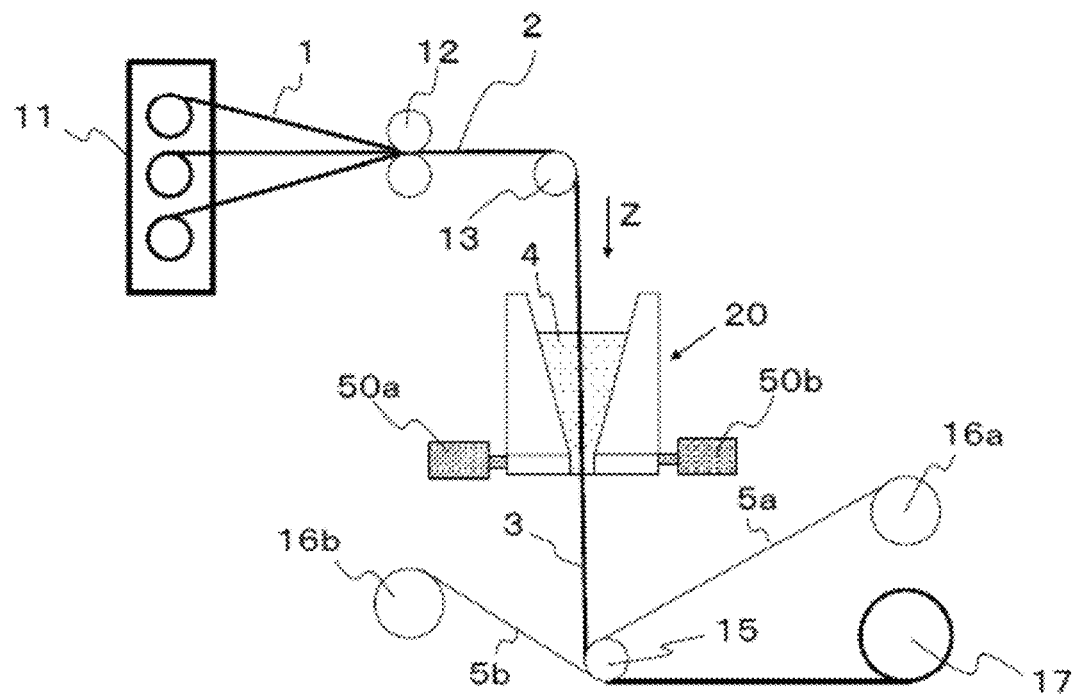
FIG. 1 is a schematic diagram of a method and apparatus for producing a prepreg according to one embodiment of the present invention.

FIG. 1 depicts a schematic diagram of a method and apparatus for producing a prepreg according to one embodiment of the present invention. FIG. 1 shows a case where a reinforcing fiber sheet is a unidirectional material (UD base material) in which a plurality of reinforcing fibers are unidirectionally arranged in planar form. A plurality of reinforcing fibers 1 unwound from creels 11 are arranged unidirectionally (in the depth direction of the page) through an arrangement device 12 to obtain a reinforcing fiber sheet 2, and then, the reinforcing fiber sheet 2 is allowed to pass through a coating section 20 in the substantially vertically downward direction Z via a conveyance roll 13. The coating section 20 stores a coating liquid therein (the coating liquid contains a matrix resin 4), and allowing the reinforcing fiber sheet 2 to pass through this causes the matrix resin 4 to be applied to both faces of the reinforcing fiber sheet 2, thus making it possible to obtain a prepreg 3. The obtained prepreg 3 is wound up in roll form by a take-up roll 15 and a wind-up device 17.

When this is done, it is also allowable that a release sheet 5a is unwound from a release sheet supply device 16a, and that the release sheet 5a is laminated on one face of the prepreg 3, which is then wound up in roll form by the wind-up device 17 via the take-up roll 15. In particular, in cases where part or all of the matrix resin 4 contained in the prepreg 3 is still present on the surface of the prepreg 3 and has high fluidity and adhesiveness when the matrix resin 4 reaches the take-up roll 15, the release sheet 5a can prevent the part of the matrix resin 4 on the surface of the prepreg 3 from being transferred to the take-up roll 15. Furthermore, the method can prevent adhesion between parts of the prepreg 3 and affords easy handling in the post-process. In addition, the release sheet may be laminated on both faces of the prepreg 3, if necessary. The release sheet is not limited to a particular one as long as the release sheet achieves the above-mentioned effect, and examples thereof include not only a release paper sheet but also an organic polymer film whose surface is coated with a release agent, and the like.

Here, examples of the reinforcing fiber include carbon fibers, glass fibers, metal fibers, metal oxide fibers, metal nitride fibers, organic fibers (aramide fibers, polybenzoxazole fibers, polyvinyl alcohol fibers, polyethylene fibers, and the like), and the like, and carbon fibers are preferably used, from the viewpoint of the mechanical property and lightness of FRP.

In addition, examples of reinforcing fiber sheets include: a unidirectional material (UD base material) in which a plurality of reinforcing fibers are unidirectionally arranged in planar form; and a reinforcing fiber fabric formed by arranging reinforcing fibers multiaxially or randomly into a sheet. Specific examples thereof include not only woven fabrics, knitted fabrics, and the like but also two-dimensionally and multiaxially arranged reinforcing fibers and randomly oriented reinforcing fibers such as non-woven fabrics, mats, and paper. In this case, the reinforcing fiber can be formed into a sheet by utilizing a method such as binder-providing, interlacing, welding, or fusing. Examples of woven fabrics that can be used include not only basic fabric structures such as plain weaves, twill, satin, and non-crimp fabrics but also bias structures, leno weaves, multiaxially woven fabrics, multi-woven fabrics, and the like. In a woven fabric formed by combining a bias structure and a UD structure, not only the UD structure, that is, a structure in which reinforcing fibers are unidirectionally arranged in planar form, inhibits the woven fabric from being deformed by a tension in a coating/impregnating process, but also the bias structure also causes quasi-isotropy, and thus, is a preferable form. In addition, a multi-woven fabric is advantageous in that the upper face and/or lower face of the woven fabric and the structure and properties of the inside of the woven fabric can be designed separately. A preferable knitted fabric is warp knitting taking into consideration the shape stability in the coating/impregnating process, and it is also possible to use braid which is circular knitting.

Among these, a UD base material is preferably used in cases where the mechanical property of FRP is prioritized, and a UD base material can be produced by a known method of arranging reinforcing fibers unidirectionally in sheet form.

In this regard, also in cases where the reinforcing fiber sheet is a reinforcing fiber fabric, the same process can be applied after the reinforcing fiber sheet 2 is formed as in FIG. 1. In the cases where a reinforcing fiber fabric is used, it is only necessary to change the creel section to a device for unwinding a reinforcing fiber fabric.

A matrix resin to be used for a prepreg in the present invention can suitably be selected in accordance with the application, and generally contains a thermoplastic resin or thermosetting resin. In addition, the matrix resin may be a molten resin melted by heating or a matrix resin which is liquid at room temperature. In addition, the matrix resin may be formed into a solution or varnish using a solvent.

Examples of matrix resins that can be used include matrix resins generally used for FRP, such as thermoplastic resins, thermosetting resins, and photo-curable resins. If these are liquids at room temperature, they may be directly used. If they are solids or viscous liquids at room temperature, they may be heated to decrease the viscosity, may be melted to be used as a melt, or may be dissolved in a solvent to be used as a solution or varnish.

Examples of thermoplastic resins that can be used include polymers having, in the principal chain, a bond selected from a carbon-carbon bond, an amide bond, an imide bond, an ester bond, an ether bond, a carbonate bond, a urethane bond, a urea bond, a thioether bond, a sulfone bond, an imidazole bond, and a carbonyl bond. Specific examples include polyacrylate, polyolefin, polyamide (PA), aramid, polyester, polycarbonate (PC), polyphenylenesulfide (PPS), polybenzimidazole (PBI), polyimide (PI), polyetherimide (PEI), polysulfone (PSU), polyethersulfone (PES), polyetherketone (PEK), polyetheretherketone (PEEK), polyetherketoneketone (PEKK), polyaryletherketone (PAEK), polyamideimide (PAI), and the like. In fields requiring heat resistance, such as aircraft applications, PPS, PES, PI, PEI, PSU, PEEK, PEKK, PEAK, and the like are suitable. On the other hand, in industrial and automobile applications, PA, polyester, PPS, a polyolefin such as polypropylene (PP), and the like are suitable in order to increase molding efficiency. These may be polymers, or oligomers or monomers may be used, because of the low viscosity and low temperature coating. Needless to say, these may be copolymerized depending on the purpose, or various kinds of them can be mixed to be used as polymer blends/alloys.

Examples of thermosetting resins include epoxy resins, maleimide resins, polyimide resins, resins having an acetylene terminal, resins having a vinyl terminal, resins having an allyl terminal, resins having a nadic acid terminal, and resins having a cyanate ester terminal. These can be used generally in combination with a hardener or a curing catalyst. In addition, these thermosetting resins can suitably be used in mixture.

As thermosetting resins suitable for embodiments of the present invention, epoxy resins are suitably used in that epoxy resins have excellent heat resistance, chemical resistance, and mechanical property. In particular, amines, phenols, and epoxy resins whose precursor is a compound having a carbon-carbon double bond are preferable. Specific examples include, but are not limited to: epoxy resins whose precursors are amines, such as various isomers of tetraglycidyl diaminodiphenylmethane, triglycidyl-p-aminophenol, triglycidyl-m-aminophenol, and triglycidylaminocresol; epoxy resins whose precursors are phenols, such as bisphenol A epoxy resins, bisphenol F epoxy resins, bisphenol S epoxy resins, phenol novolac epoxy resins, and cresol novolac epoxy resins; epoxy resins whose precursors are compounds having a carbon-carbon double bond, such as alicyclic epoxy resins; and the like. Bromated epoxy resins resulting from bromating these epoxy resins are also used. Epoxy resins whose precursors are aromatic amines and which are typified by tetraglycidyl diaminodiphenylmethane are most suitable for embodiments of the present invention because the epoxy resins have good heat resistance and good adhesiveness to reinforcing fibers.

Thermosetting resins are preferably used in combination with hardeners. For example, for epoxy resins, a hardener can be used if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzoic acid ester types are, suitable. According to specific description, dicyandiamide provides excellent storage stability of prepreg, and accordingly, is used by preference. In addition, various isomers of diaminodiphenyl sulfone afford cured objects having good heat resistance, and accordingly, are most suitable for embodiments of the present invention. As amino benzoic acid ester types, trimethyleneglycol di-p-aminobenzoate and neopentylglycol di-p-aminobenzoate are used by preference and have lower heat resistance but have excellent tensile strength, compared with diaminodiphenyl sulfone, and accordingly, are used selectively in accordance with the application. Needless to say, a curing catalyst can also be used, if necessary. In addition, a hardener or a curing catalyst and a complexing agent capable of forming a complex can be used together, from the viewpoint of enhancing the pot life of a coating liquid.

In embodiments of the present invention, a mixture of a thermosetting resin and a thermoplastic resin is also suitably used. A mixture of a thermosetting resin and a thermoplastic resin affords better results than a thermosetting resin used singly. This is because a thermosetting resin and a thermoplastic resin have antinomic characteristics: that is, a thermosetting resin is generally disadvantageouly brittle but can be molded at low pressure in an autoclave, and contrarily, a thermoplastic resin is generally advantageously tough but difficult to mold at low pressure in an autoclave, and accordingly, using these in mixture can effect a balance between properties and moldability. Such a mixture to be used preferably contains more than 50 mass % thermosetting resin, from the viewpoint of the mechanical property of FRP obtained by curing prepreg.

In addition, a prepreg in embodiments of the present invention is allowed to contain polymer particles such as the above-mentioned interlayer reinforcing particles, and such polymer particles are generally caused to be contained in a matrix resin. In this case, the glass transition temperature (Tg) or melting temperature (Tm) of polymer particles which is 20° C. or more higher than the temperature of a coating liquid makes it easier to retain the form of the polymer particle in the matrix resin, and accordingly is preferable. The Tg of polymer particles can be measured under the following conditions using a temperature-modulated DSC. As a temperature-modulated DSC device, Q1000 manufactured by TA Instruments, Inc. is suitable, and this can be used on the basis of calibration carried out using high-purity indium under a nitrogen atmosphere. The measurement conditions can be based on a temperature ramp rate of 2° C./minute, and the temperature-modulation condition can be based on a cycle of 60 seconds and an amplitude of 1° C. The reversible components are separated from the total heat flow obtained under these conditions, and the temperature at the midpoint of the step signal can be regarded as Tg.

In addition, Tm can be measured using a common DSC at a temperature ramp rate of 10° C./minute, and the temperature at the peak top of the peak-shaped signal corresponding to melting is regarded as Tm.

In addition, the polymer particles are preferably insoluble in a matrix resin, and as such polymer particles, suitable ones described in, for example, WO2009/142231 as a reference can be used. More specifically, polyamides and polyimides can be preferably used, and polyamides that have excellent toughness and accordingly can significantly enhance the impact resistance are most preferable. Examples of polyamides that can be suitably used include polyamide 12, polyamide 11, polyamide 6, polyamide 66, polyamide 6/12 copolymers, and a polyamide modified to have a semi IPN (macromolecular interpenetrating network structure) with an epoxy compound (semi IPN polyamide) described in Example 1 of JP01-104624A. As to the shape of this thermoplastic resin particle, the particle may be a spherical particle, a nonspherical particle, or a porous particle, and the spherical shape is particularly preferable in the production method according to the present invention in order not to decrease the resin flow property. In addition, the spherical shape is a preferable aspect in that the spherical shape has no starting point for stress concentration and affords high impact resistance.

Examples of commercially available polyamide particles that can be used include SP-500, SP-10, TR-1, TR-2, 842P-48, 842P-80 (which are all manufactured by Toray Industries, Inc.), "Orgasol (registered trademark)" 1002D, 2001UD, 2001EXD, 2002D, 3202D, 3501D, 3502D (which are all manufactured by Arkema K.K.), "Grilamid (registered trademark)" TR90 (manufactured by Emser Werke, Inc.), "TROGAMID (registered trademark)" CX7323, CX9701, CX9704 (manufactured by Degussa AG), and the like. These polyamide particles may be used singly or in combination of two or more kinds thereof.

In addition, polymer particles are preferably retained in the interlayer resin layer of CFRP in order to impart high toughness to the interlayer resin layer. For this, the number average particle size of the polymer particles is preferably in the range from 5 to 50 µm, more preferably in the range from 7 to 40 µm, still more preferably in the range from 10 to 30 µm. Having a number average particle size of 5 µm or more makes it possible that the particles do not intrude into the reinforcing fiber bundle, but are retained in the interlayer resin layer of the obtained fiber reinforced composite material. Having a number average particle size of 50 µm or less makes it possible that the thickness of the matrix resin layer on the surface of the prepreg is made suitable, and eventually that the fiber mass content in the obtained CFRP is made suitable.

The width of a prepreg in the present invention is not limited to a particular one, and the width may be broad, tens of centimeters to approximately two meters, or may be tape-like, several millimeters to tens of millimeters. The width can be selected in accordance with the application. In recent years, a device called ATL (Automated Tape Laying) or AFP (Automated Fiber Placement) in which narrow prepregs or prepreg tapes are automatically laminated has widely been used to make a prepreg laminating step more efficient, and the width is also preferably adapted to such a device. ATL often involves use of narrow prepregs having a width of approximately 7.5 cm, approximately 15 cm, and approximately 30 cm, and AFP often involves use of prepreg tapes having a width of approximately 3 mm to approximately 25 mm.

Figure 2:
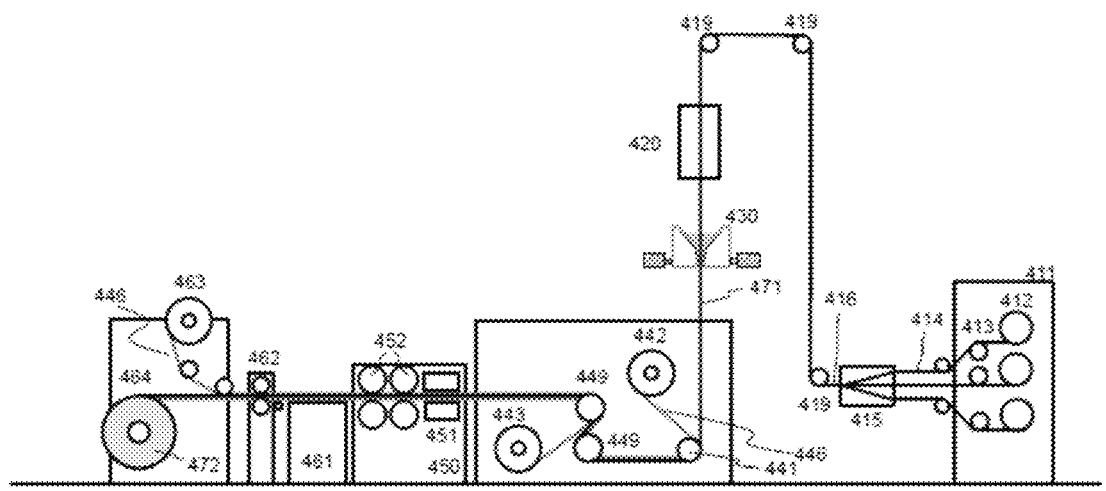
FIG. 2 is a schematic diagram depicting a method of producing a prepreg according to an embodiment of the present invention other than in FIG. 1.

In addition, FIG. 2 depicts another preferable aspect of the present production method. The reinforcing fibers 414 are withdrawn from reinforcing fiber bobbins 412 mounted onto the creel 411, pass by diverting guides 413, and are formed into a reinforcing fiber sheet 416 by a reinforcing fiber arrangement device 415. FIG. 2 depicts three reinforcing fiber bobbins, but the actual required number of the bobbins to be mounted is determined in accordance with the purpose. The reinforcing fiber sheet 416 is introduced upward via a diverting roll 419, then conveyed vertically downward via diverting rolls 419, and preheated by a preheating device 420 up to a temperature equal to or greater than the temperature of a matrix resin stored in a coating section. Then, the sheet is coated and impregnated with the matrix resin in the coating section 430, thus making it possible to form a prepreg 471. The prepreg 471 is laminated, on a diverting roll 441, with a release sheet 446 unwound from a release sheet (upper) supply device 442, and taken up by high tension take-up S-shaped arranged rolls 449, which are a high tension take-up device. At the same time, the resulting prepreg is laminated, on high tension take-up S-shaped arranged rolls 449, with a release sheet unwound from a release sheet (lower) supply device 443, so that release sheets are arranged on both upper and lower faces of the prepreg. Then, the resulting prepreg is supplied into an additional-impregnation device 450, and preheated by hot plates 451, followed by advancing the impregnation using heated nip rolls 452. Then, the resulting prepreg is cooled by a cooling device 461, and then, passes through a take-up device 462. The upper release sheet is peeled away, and the prepreg/release sheet is wound up in roll form by a winder 464. The upper release sheet is wound up by the release sheet (upper) wind-up device 463.

Below, detailed preferable aspects of the present production method will be further described.

<Formation of UD Base Material>

In cases where a UD base material is used as a reinforcing fiber sheet, a method used to form a UD base material may be a known method and is not limited to any particular one, and it is preferable, from the viewpoints of process efficiency and arrangement uniformity, to preliminarily arrange single fibers to form a reinforcing fiber bundle, followed by further arranging the reinforcing fiber bundle to form a UD base material. For example, in the case of carbon fiber, a "tow" that is a tape-like reinforcing fiber bundle is wound on a bobbin, and a reinforcing fiber sheet can be obtained by arranging the tape-like reinforcing fiber bundle withdrawn from the bobbin. In addition, it is preferable to have a reinforcing fiber arrangement mechanism for orderly arranging reinforcing fiber bundles withdrawn from the bobbins fit onto the creels so that there can be no undesirable overlapping nor folding in the reinforcing fiber bundles in the reinforcing fiber sheet and no split between the reinforcing fiber bundles. As a reinforcing fiber arrangement mechanism, a known roller, a comb type of arrangement device, or the like can be used. In addition, layering a plurality of preliminarily arranged reinforcing fiber sheets is useful from the viewpoint of decreasing splits between the reinforcing fibers. In this regard, the creels are preferably provided with a tension control mechanism operated when the reinforcing fibers are withdrawn. As a tension control mechanism, a known one can be used, and examples thereof include a braking mechanism. In addition, tension can also be controlled, for example, by adjusting a yarn guide.

<Smoothing of Reinforcing Fiber Sheet>

In the above-mentioned production method, increasing the surface smoothness of the reinforcing fiber sheet can enhance the uniformity of the amount of the matrix resin applied in the coating section. For this reason, the reinforcing fiber sheet is preferably introduced into the coating section after it is smoothed. The smoothing treatment method is not limited to a particular one, and examples thereof include a method in which physical pressure is applied using opposing rolls or the like and a method in which reinforcing fibers are moved using air flow. A method in which physical pressure is applied is easy and convenient, less likely to disturb the arrangement of the reinforcing fibers, and accordingly preferable. More specifically, calendering or the like can be used. The method in which air flow is used not only is less likely to cause abrasion but also has the effect of widening a reinforcing fiber sheet, and accordingly, is preferable. A smoothing device can be installed between the reinforcing fiber arrangement device 415 and the preheating device 420, for example, in FIG. 2.

<Widening of Reinforcing Fiber Sheet>

In the above-mentioned production method, it is also preferable, from the viewpoint of enabling a thin-layer prepreg to be produced efficiently, that the reinforcing fiber sheet is introduced into the liquid pool after it is treated for widening of the fiber bundle. In addition, causing the thin-layer prepreg to be multilayered makes it possible to make the prepreg layer thinner and to enhance the toughness and impact resistance of the FRP. The treatment method of widening of the fiber bundle is not limited to a particular one, and examples thereof include a method in which vibration is applied mechanically, a method in which the reinforcing fiber bundle is expanded using air flow, and the like. Examples of methods in which vibration is applied mechanically include a method in which a reinforcing fiber sheet is brought in contact with vibrating rolls, as described, for example, in JP 2015-22799 A. As to the vibration direction, vibration is preferably applied in the Y-axis direction (horizontal direction) or the Z-axis direction (vertical direction), assuming that the running direction of the reinforcing fiber sheet is the X-axis. It is also preferable to use a combination of the horizontally vibrating rolls and the vertically vibrating rolls. In addition, providing a plurality of projections on the surface of the vibration roll makes it possible to suppress abrasion of the reinforcing fiber on the roll, and accordingly is preferable. As a method in which air flow is used, for example, a method described in SEN-I GAKKAISHI, vol. 64, P-262-267 (2008) can be used. A widening device can be installed between the reinforcing fiber arrangement device 415 and the preheating device 420, for example, in FIG. 2.

<Preheating of Reinforcing Fiber Sheet>

In the present invention, introducing the reinforcing fiber sheet into the liquid pool after heating the sheet suppresses a decrease in the temperature of the matrix resin and enhances the viscosity uniformity of the coating liquid, and accordingly, is preferable. The reinforcing fiber sheet is preferably heated up to, or to the vicinity of, the temperature of the matrix resin in the liquid pool, and examples of various heating means that can be used for this purpose include air heating, infrared heating, far-infrared heating, laser heating, contact heating, heat medium heating (steam), and the like. Among others, an infrared heating device is easy and convenient and can directly heat the reinforcing fiber sheet, and accordingly, can achieve efficient heating up to a desired temperature even at a high running speed, and is preferable.

<Viscosity of Matrix Resin>

A matrix resin used in the present invention preferably has an optimal viscosity selected from the viewpoint of processability and stability. Specifically, it is preferable to have a viscosity in the range from 1 to 60 Pa·s because such a viscosity makes it possible that a drip of the liquid at the outlet of the narrowed section is suppressed and that the high-speed running properties and stable running properties of the reinforcing fiber sheet are enhanced. As used herein, a viscosity refers to a value measured at a strain rate of 3.14 $s^{-1}$ at a coating liquid temperature in the liquid pool.

<Coating Step>

Figure 3:
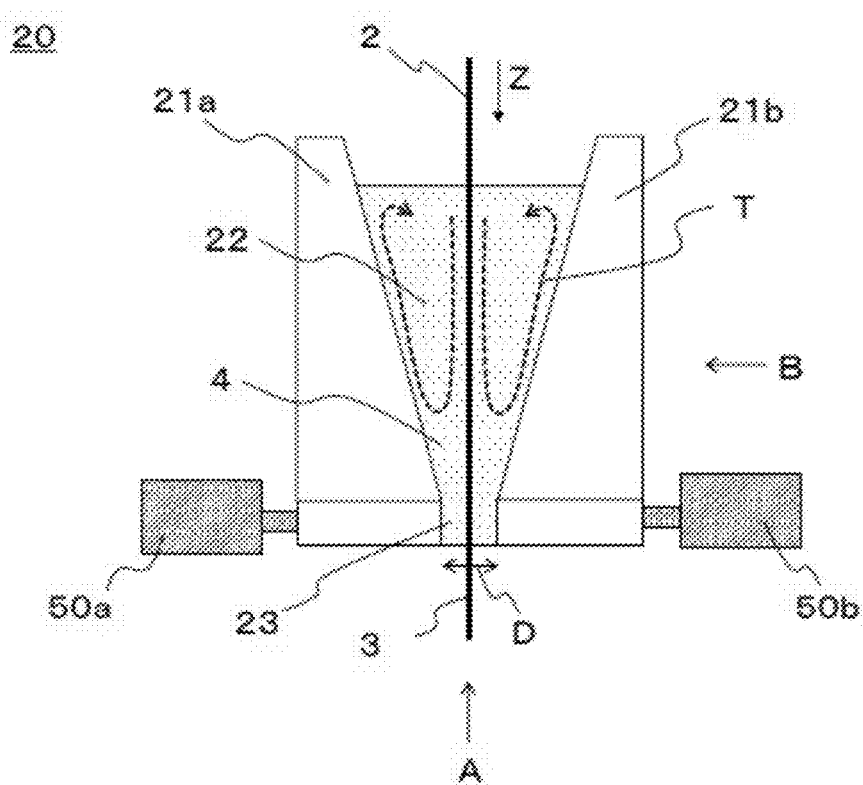
FIG. 3 is an enlarged detailed cross-sectional view of the coating section 20 portion in FIG. 1.

Next, with reference to FIGS. 3 to 6, a step of providing the reinforcing fiber sheet with the matrix resin will be described in detail. Here, a UD base material is exemplified as a reinforcing fiber sheet 2, and the reinforcing fibers are arranged in the depth direction of the page. FIG. 3 is an enlarged detailed cross-sectional view of the coating section 20 in FIG. 1. The coating section 20 has wall constituent members 21a and 21b that are opposed to each other with a predetermined gap D in between. Between the wall constituent members 21a and 21b, a liquid pool 22 whose cross-sectional area decreases continuously in the vertically downward direction Z and a slit-like narrowed section 23 positioned below the liquid pool 22 (on the discharge side of the reinforcing fiber sheet 2) and having a cross-sectional area smaller than the cross-sectional area of the top side of the liquid pool 22 (the introduction side of the reinforcing fiber sheet 2) are formed. Furthermore, external force application mechanisms 50a and 50b are provided on the outsides of the wall constituent members 21a and 21b.

In the coating section 20, the reinforcing fiber sheet 2 introduced into the liquid pool 22 runs downward, and, at the same time, is accompanied by the matrix resin 4 surrounding the reinforcing fiber sheet. During this, the accompanying matrix resin 4 is gradually compressed, and the pressure of the matrix resin 4 increases toward the lower portion of the liquid pool 22, because the cross-sectional area of the liquid pool 22 decreases in the vertically downward direction Z. When the pressure in the lower portion of the liquid pool 22 increases, it is more difficult for the accompanying liquid flow to flow toward the lower portion any further, and the matrix resin 4 flows toward the wall constituent members 21a and 21b in the regions sandwiched between the reinforcing fiber sheet 2 and the wall constituent members 21a and 21b, and then impeded by the wall constituent members 21a and 21b, resulting in flowing upward. As a result, a circular stream T is formed along the external plane of the reinforcing fiber sheet 2 and the wall surfaces of the wall constituent members 21a and 21b in the liquid pool 22. Thus, even if the reinforcing fiber sheet 2 brings fuzz in the liquid pool 22, the fuzz moves along the circular stream T, and cannot approach the lower portion of the liquid pool 22, where the liquid pressure is larger, or the narrowed section 23. Further as below-mentioned, bubbles stick to the fuzz, and accordingly, the fuzz moves upward along the circular stream, and passes near the liquid surface at the top of the liquid pool 22. This also makes it possible not only that the fuzz is prevented from clogging the lower portion of the liquid pool 22 and the narrowed section 23, but also that the retained fuzz is easily collected through the liquid surface at the top of the liquid pool 22. Furthermore, when the reinforcing fiber sheet 2 is run at a high speed, the liquid pressure further increases, and accordingly, the fuzz elimination effect becomes higher. As a result, this makes it possible to provide the reinforcing fiber sheet 2 with the matrix resin 4 at a higher speed, and enhances productivity significantly.

In addition, the increased liquid pressure has the effect of making it easier for the reinforcing fiber sheet 2 to be impregnated with the matrix resin 4. This is based on the property (Darcy's law) according to which the degree at which a porous object such as a reinforcing fiber bundle is impregnated with a coating liquid is increased by the pressure of the coating liquid. This can also enhance the impregnation effect because running the reinforcing fiber sheet 2 at a higher speed increases the liquid pressure further. In this regard, the matrix resin 4 is impregnated through gas-liquid replacement with bubbles remaining in the reinforcing fiber sheet 2, and the bubbles are discharged through the splits in the reinforcing fiber sheet 2 by the liquid pressure and ascending force in the orientation direction (in the vertically upward direction) of the fibers. Here, the bubbles are discharged without pushing away the in-coming matrix resin 4 for impregnation, and accordingly, also has the effect of not inhibiting impregnation. In addition, part of the bubbles are discharged out of the surface of the reinforcing fiber sheet 2 into the liquid, and the bubbles rapidly are eliminated in the vertically upward direction by the liquid pressure and ascending force, and accordingly, are not retained in that lower portion of the liquid pool 22 which has a high impregnation effect, whereby the effect of promoting the discharge of the bubbles efficiently is also achieved. These effects make it possible to impregnate the reinforcing fiber sheet 2 with the matrix resin 4 efficiently.

Further, the increased liquid pressure allows the reinforcing fiber sheet 2 and/or the prepreg 3 to be automatically aligned with the center of the gap D, and the reinforcing fiber sheet 2 and/or the prepreg 3 is/are not directly abraded against the wall surfaces of the liquid pool 22 and the narrowed section 23, whereby the effect of suppressing the generation of fuzz here is also achieved. This is because, when any external disturbance or the like causes the reinforcing fiber sheet 2 and/or the prepreg 3 to approach either side in the gap D, the matrix resin 4 is pushed and compressed in the resulting narrower gap on the approached side, and accordingly, the liquid pressure further increases on the approached side, pushing the reinforcing fiber sheet 2 and/or the prepreg 3 back to the center of the gap D.

The narrowed section 23 is designed to have a smaller cross-sectional area than the top side of the liquid pool 22. As understood from FIG. 3, the smaller cross-sectional area is simply due to the fact that the length in the direction perpendicular to the pseudo-plane of the reinforcing fiber sheet 2 is smaller, that is, the distance between the members is narrower. This is intended to achieve the impregnation and the automatic alignment effect through increasing the liquid pressure in the narrowed section as above-mentioned. In addition, the cross-sectional shape of the uppermost face of the narrowed section 23 is preferably made to conform to the cross-sectional shape of the lowermost face of the liquid pool 22, from the viewpoint of the running properties of the reinforcing fiber sheet 2 and the flow control of the matrix resin 4, but, if necessary, the cross-sectional shape of the uppermost face of the narrowed section 23 may be made slightly larger.

In addition, the total amount of the matrix resin 4 applied to the reinforcing fiber sheet 2 can be controlled in the gap D in the narrowed section 23. More specifically, the total amount of the matrix resin 4 applied to the reinforcing fiber sheet 2 is generally in proportion to the size of the gap D in the narrowed section 23. For example, in cases where the total amount of the matrix resin 4 applied to the reinforcing fiber sheet 2 is desired to be larger (the areal weight is desired to be larger), the wall constituent members 21a and 21b may be disposed in such a manner that the gap D is wider. The gap D is not limited to any particular determination method. For example, the gap may be determined using plate-like shims sandwiched in the portions through which the reinforcing fiber sheet 2 does not pass between the wall constituent members 21a and 21b, or may be determined by placing the wall constituent members 21a and 21b on a precision stage movable in the horizontal direction in FIG. 3 and controlling the position of the precision stage.

Figure 4:
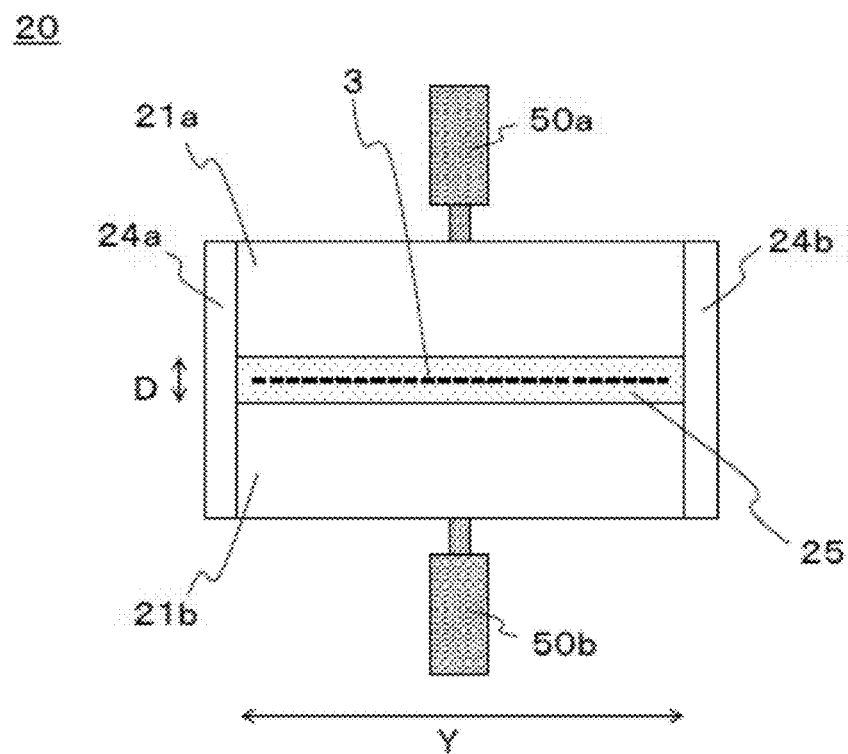
FIG. 4 is a bottom view of the coating section 20 in FIG. 1, as viewed in the direction A in FIG. 3.

FIG. 4 is a bottom view of the coating section 20, as viewed in the direction A in FIG. 3. In the coating section 20, side wall members 24a and 24b are provided to prevent the matrix resin 4 from leaking by both ends of the reinforcing fiber sheet 2 in the arrangement direction of the reinforcing fibers, and the outlet 25 of the narrowed section 23 is formed in the space surrounded by the wall constituent members 21a and 21b and the side wall members 24a and 24b. Here, the outlet 25 is slit-like, and the cross-sectional aspect ratio (Y/D in FIG. 4) may be set in accordance with the shape of the reinforcing fiber sheet 2 and/or the prepreg 3 which is/are desired to be provided with the matrix resin 4. In this regard, the size of Y is usually equal to the size of L (in cases where no width regulation mechanism is used) or L2 (in cases where a width regulation mechanism is used).

Figure 5:
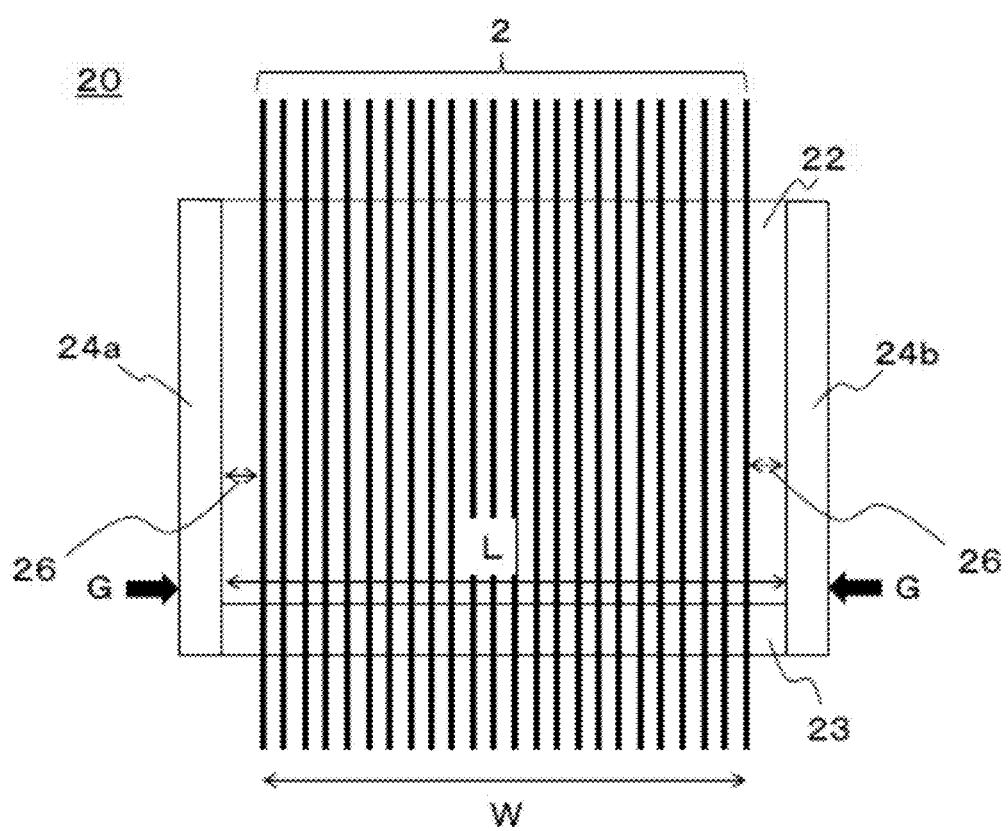
FIG. 5 is a cross-sectional view depicting the structure of the inside of the coating section 20 in FIG. 1, as viewed in the direction B in FIG. 3.

FIG. 5 is a cross-sectional view depicting the structure of the inside of the coating section 20, as viewed in the direction B. Here, to make the view easier to see, the wall constituent member 21b is omitted, and in addition, the reinforcing fiber sheet 2 is depicted as if the reinforcing fibers are arranged with a split therebetween, but, in reality, it is preferable to arrange the reinforcing fibers with no split therebetween, from the viewpoint of the grade of the prepreg 3 and the mechanical property of FRP.

Figure 6:
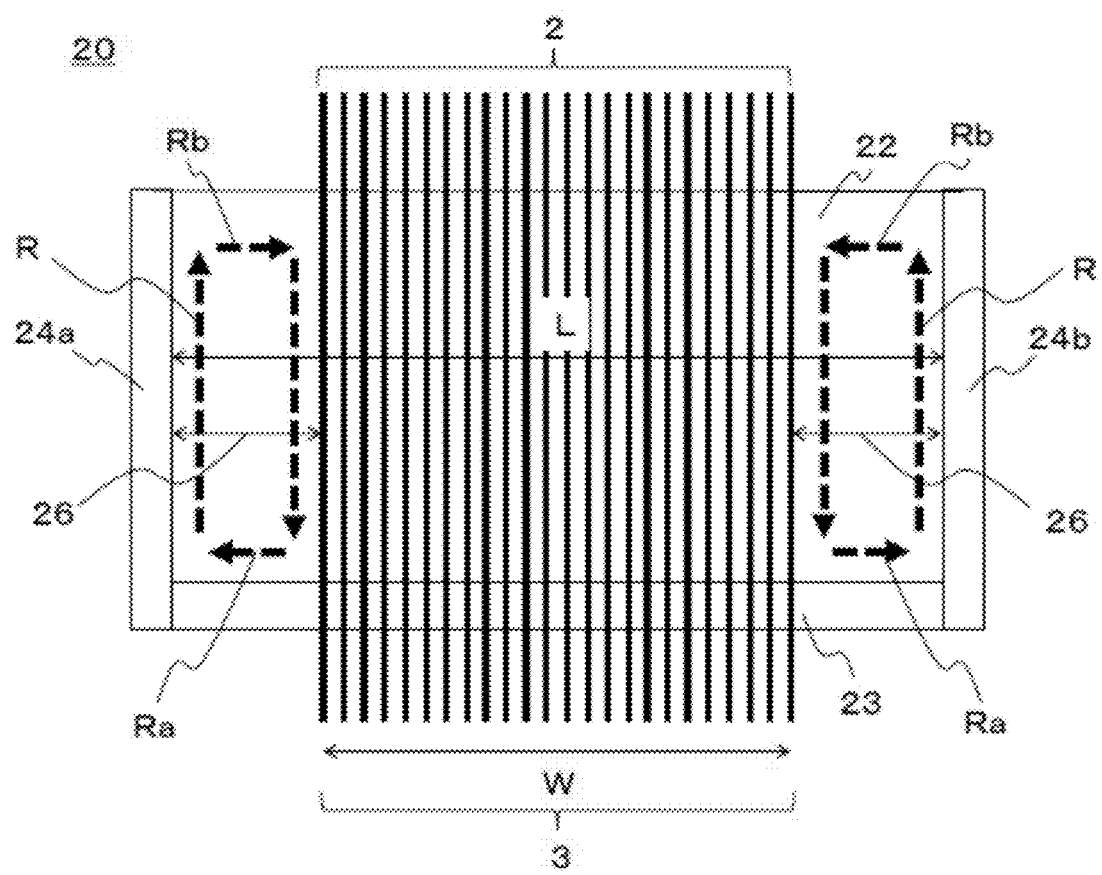
FIG. 6 is a schematic cross-sectional view explaining the flow of the matrix resin 4 in the clearance gap 26 in FIG. 5.

FIG. 6 depicts the flow of the matrix resin 4 in the clearance gap 26. When the clearance gap 26 is large, a circular stream R in the edge in the matrix resin 4 is generated in the depicted direction. This circular stream R in the edge becomes an outward flow (Ra) in the lower portion of the liquid pool 22, and accordingly, results in tearing apart the reinforcing fiber sheet 2 (causing splitting of the reinforcing fiber bundle in cases where the reinforcing fiber sheet 2 is a UD base material) or expanding the distance between the reinforcing fibers, and because of this, there is a possibility that arrangement ununiformity is caused in the reinforcing fibers in the resulting prepreg 3. On the other hand, the circular stream R becomes an inward flow (Rb) in the upper portion of the liquid pool 22, and accordingly, the reinforcing fiber sheet 2 is compressed in the width direction, resulting in edge folding of the reinforcing fiber sheet in some cases.

In view of this, width regulation for making the clearance gap 26 smaller is carried out in embodiments of the present invention, whereby the generation of the circular stream in the edge is preferably suppressed. Specifically, the width L of the liquid pool 22, that is, the distance L between the side plate members 24a and 24b is preferably adapted to satisfy the below-mentioned relationship with the width W of the reinforcing fiber sheet measured immediately under the narrowed section 23.

$L \leq W+10$ (mm)

This suppresses the generation of a circular stream in the edge and makes it possible to suppress splitting and edge folding of the reinforcing fiber sheet 2 and to obtain the prepreg 3 in which the reinforcing fibers are uniformly arranged over the full width (W) of the prepreg 3 and which is of high grade and has high stability. This can enhance not only the grade and quality of the prepreg but also the mechanical property and quality of FRP obtained using the prepreg. The relationship between L and W is more preferably $L \leq W+2$ (mm), and thus, the splitting and edge folding of the reinforcing fiber sheet 2 can further be suppressed.

In addition, it is preferable to make adjustments so that the lower limit of L is equal to or greater than W−5 (mm), from the viewpoint of enhancing the uniformity of the dimension in the width direction of the prepreg 3.

In this regard, this width regulation is preferably carried out at least in the lower portion of the liquid pool 22 (the G position in FIG. 5), from the viewpoint of suppressing the generation of the circular stream R in the edge due to a high liquid pressure in the lower portion of the liquid pool 22. Furthermore, this width regulation is more preferably carried out in the whole region of the liquid pool 22, whereby the generation of the circular stream R in the edge can be suppressed substantially completely, and, as a result, the split and edge folding of the reinforcing fiber sheet can be suppressed substantially completely.

In addition, the width regulation may be carried out only to the liquid pool 22 if it is carried out only from the viewpoint of suppressing the circular stream in the edge in the clearance gap 26, but it is preferable to carry out the width regulation also to the narrowed section 23 in the same way, from the viewpoint of suppressing excessive application of the matrix resin 4 to the sides of the prepreg 3.

<Width Regulation Mechanism>

Figure 7:
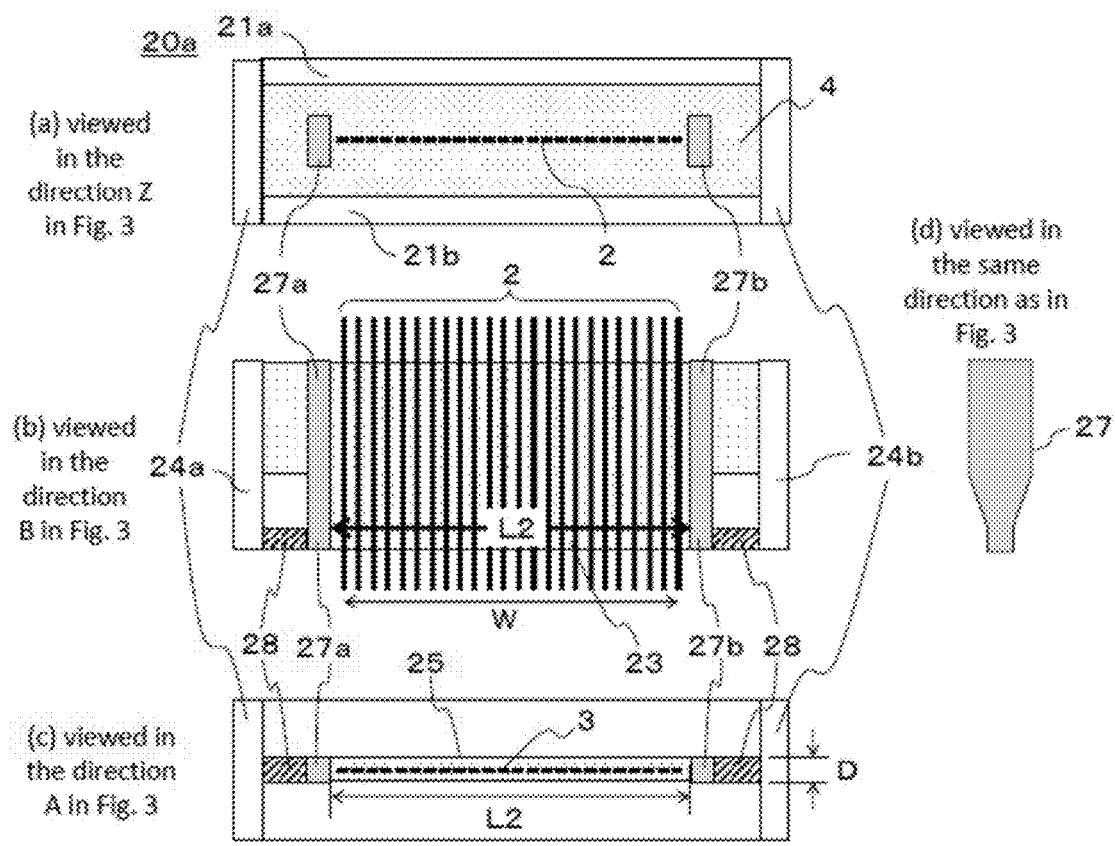
FIG. 7 is a view depicting an example of a coating section (coating section 20a) having a width regulation mechanism used therein.

The above-mentioned has described a case where the side wall members 24a and 24b serve for the purpose of width regulation, but, as shown in FIG. 7, it is also possible to provide width regulation mechanisms 27a and 27b between the side wall members 24a and 24b and to regulate the width of the reinforcing fiber sheet 2 using such mechanisms. This is preferable because the capability to freely change the width regulated by the width regulation mechanisms makes it possible to use one coating section to produce different prepregs having different widths. Here, the relationship between the width (W) of the reinforcing fiber sheet immediately under the narrowed section in FIG. 7(b) and the width (L2) regulated by the width regulation mechanisms at the bottom ends of the width regulation mechanisms is preferably $L2 \leq W+10$ (mm), more preferably $L2 \leq W+2$ (mm). In addition, it is preferable to make adjustments so that the lower limit of L2 is equal to or greater than W−5 (mm), from the viewpoint of enhancing the uniformity of the dimension in the width direction of the prepreg 3. The shape and material of the width regulation mechanism are each not limited to a particular one, and a plate-like bush type is easy and convenient, and accordingly, preferable. On the other hand, the shape from the middle portion to the lower portion of the width regulation mechanism is preferably in conformity to the internal shape of the coating section because such conformity can make it possible to suppress the retention of the coating liquid in the liquid pool and suppress the degradation of the coating liquid. In this sense, the width regulation mechanism is preferably inserted into the narrowed section 23, as depicted in FIG. 7(b).

In addition, FIG. 7 shows an example of a plate-like bush as the width regulation mechanism, and shows an example in which the portion below the position J of the bush in FIG. 7(d) is in conformity to the tapered shape of the liquid pool 22 and in which the portion is inserted into the narrowed section 23. FIG. 7(b) shows an example in which L2 is constant from the liquid surface to the outlet, but the width to be regulated may vary depending on the site to the extent that the purpose of the width regulation mechanism is fulfilled. The width regulation mechanism can be fixed in the coating section 20 by an arbitrary method, and fixing the mechanism of a plate-like bush type at a plurality of sites in the vertical direction makes it possible to suppress variation of the regulation width due to the deformation of the plate-like bush caused by a high liquid pressure. For example, using a stay for the upper portion and inserting the lower portion into the coating section makes it easy to regulate the width by the width regulation mechanism, and accordingly, is preferable.

Furthermore, disposing shims 28 so as to seal the external sides of the width regulation mechanisms 27a and 27b at the narrowed section 23 makes it possible to prevent the matrix resin 4 from leaking through the portions through which the reinforcing fiber sheet 2 does not pass and to accurately determine the size of the gap D using the shims 28, and is preferable.

<Shape of Liquid Pool>

As described above in detail, it is important in the present production method that allowing the cross-sectional area to decrease continuously in direction Z in the liquid pool 22 increases the liquid pressure in the running direction of reinforcing fiber sheet 2, and here, the shape of the cross-sectional area decreasing continuously in the running direction of the reinforcing fiber sheet is not limited to a particular one as long as the shape allows the liquid pressure to increase continuously in the running direction. The shape may be a tapered (linear) one or show a curved form such as a trumpet shape in the cross-sectional view of the liquid pool. In addition, the portion whose cross-sectional area decreases may be continuous over the full length of the liquid pool, or is allowed to contain a part whose cross-sectional area does not decrease or contrarily increases, to the extent that the object and effect of the present invention can be achieved. These will be described in detail below with reference to FIGS. 8 to 11.

Figure 8:
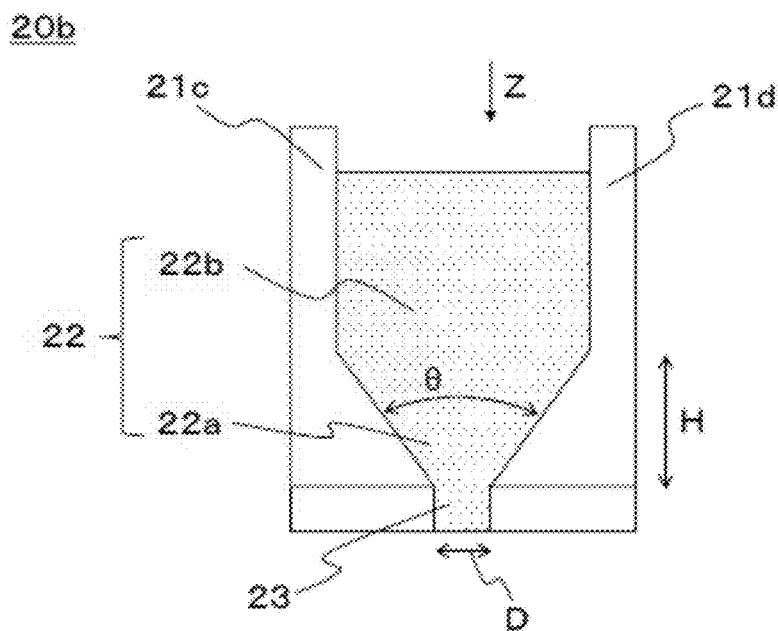
FIG. 8 is a detailed cross-sectional view of the coating section 20b according to an embodiment of the present invention other than in FIG. 3.

FIG. 8 is a detailed cross-sectional view of the coating section 20b according to an embodiment other than in FIG. 3. Here, no external force application mechanism is included in the drawing (as in FIG. 9 to FIG. 12). The coating section 20b is the same as the coating section 20 in FIG. 3 except that wall constituent members 21c and 21d constituting the liquid pool 22 are different in shape. As in the coating section 20b in FIG. 8, the liquid pool 22 may be sectioned into the region 22a whose cross-sectional area decreases continuously in the vertically downward direction Z and the region 22b whose cross-sectional area does not decrease. In this respect, the vertical height H along which the cross-sectional area decreases continuously is preferably 10 mm or more. The vertical height H along which the cross-sectional area decreases continuously is more preferably 50 mm or more. This assuredly affords a distance along which the matrix resin accompanying the reinforcing fiber sheet is compressed in the region 22a whose cross-sectional area of the liquid pool 22 decreases continuously, whereby the liquid pressure generated in the lower portion of the liquid pool 22 can be increased sufficiently. This consequently makes it possible to obtain the effect of allowing the liquid pressure to prevent fuzz from clogging the narrowed section 23 and the effect of allowing the liquid pressure to induce the impregnation of the reinforcing fiber sheet with the matrix resin.

In cases where, as in the coating section 20 in FIG. 3 and the coating section 20b in FIG. 8, the region 22a whose cross-sectional area decreases continuously in the liquid pool 22 is tapered, the smaller the opening angle θ of the taper, the more preferable, and specifically, the angle is preferably an acute angle (90° or less). This makes it possible that the effect of compressing the matrix resin in the region 22a (tapered portion) whose cross-sectional area decreases continuously in the liquid pool 22 is enhanced, and that a high liquid pressure is made easier to obtain.

Figure 9:
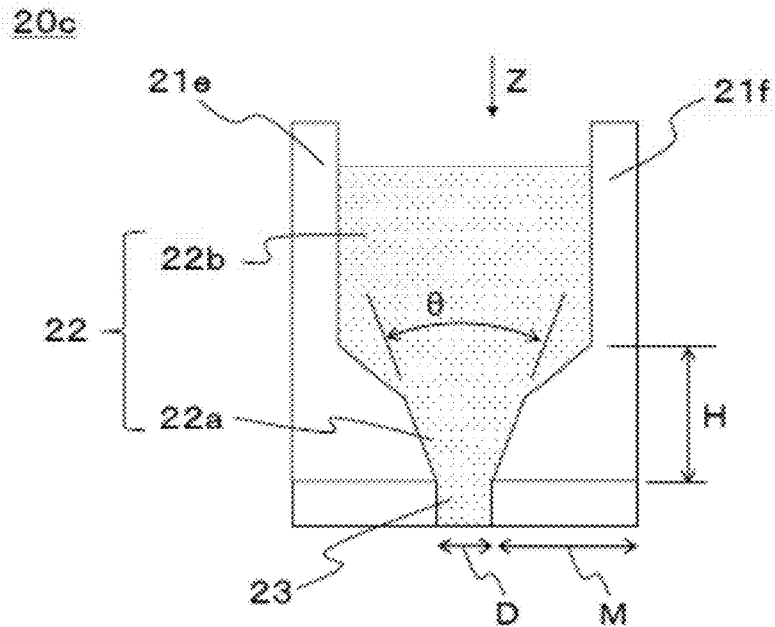
FIG. 9 is a detailed cross-sectional view of the coating section 20c according to an embodiment of the present invention other than in FIG. 8.

FIG. 9 is a detailed cross-sectional view of the coating section 20c according to an embodiment other than in FIG. 8. The coating section 20c is the same as the coating section 20b in FIG. 8 except that wall constituent members 21e and 21f constituting the liquid pool 22 form a two-tier taper. In this manner, the region 22a whose cross-sectional area of the liquid pool 22 decreases continuously may be constituted by a multi-tapered portion composed of two or more tiers. In this respect, the opening angle θ of the tapered portion nearest the narrowed section 23 is preferably an acute angle, from the viewpoint of enhancing the above-mentioned compression effect. Also in this case, the height H of the region 22a along which the cross-sectional area of the liquid pool 22 decreases continuously is preferably 10 mm or more. The vertical height H along which the cross-sectional area decreases continuously is more preferably 50 mm or more. Having a multi-tier tapered portion as the region 22a whose cross-sectional area decreases continuously in the liquid pool 22, as in FIG. 9, makes it possible to maintain the volume of the matrix resin 4 that can be stored in the liquid pool 22, and at the same time, to decrease the angle θ of the tapered portion nearest the narrowed section 23. This increases the liquid pressure caused in the lower portion of the liquid pool 22, and can further enhance the fuzz elimination effect and the impregnation effect of the matrix resin 4.

Figure 10:
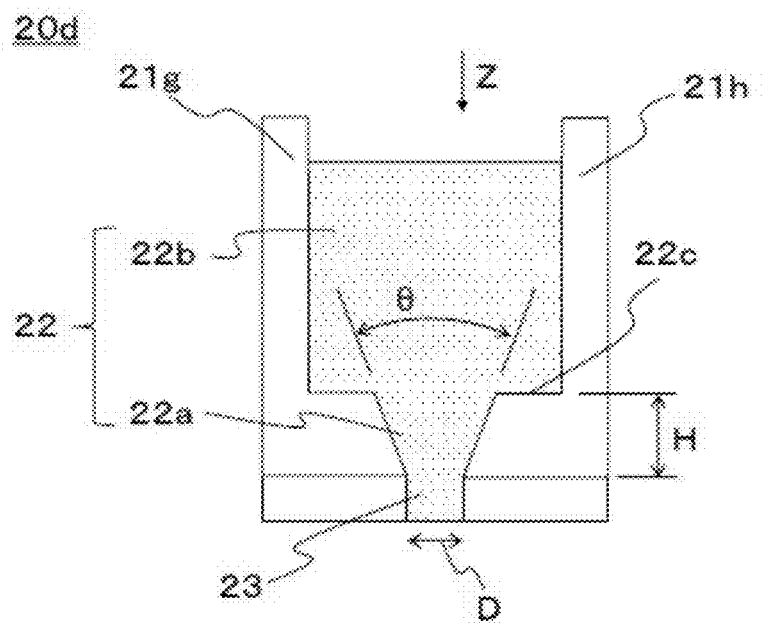
FIG. 10 is a detailed cross-sectional view of the coating section 20d according to an embodiment of the present invention other than in FIG. 8.

FIG. 10 is a detailed cross-sectional view of the coating section 20d according to an embodiment other than in FIG. 8. The coating section 20d is the same as the coating section 20b in FIG. 8 except that wall constituent members 21g and 21h constituting the liquid pool 22 form a tier. In this manner, allowing the lowermost portion of the liquid pool 22 to have the region 22a whose cross-sectional area decreases continuously makes it possible to obtain the effect of increasing the liquid pressure, wherein the effect is an object of the present invention, and accordingly, the other part of the liquid pool 22 may include a region 22c whose cross-sectional area decreases discontinuously and suddenly. Allowing the liquid pool 22 to have such a shape as in FIG. 10 makes it possible that the shape of the region 22a whose cross-sectional area decreases continuously is maintained, and at the same time, that the depth B of the liquid pool 22 is enlarged to increase the volume of the matrix resin 4 that can be stored. As a result, even in cases where the matrix resin 4 cannot be supplied into the coating section 20d continuously, the matrix resin can continue to be provided to the reinforcing fiber sheet for a long time, whereby the productivity of the prepreg can be enhanced.

Figure 11:
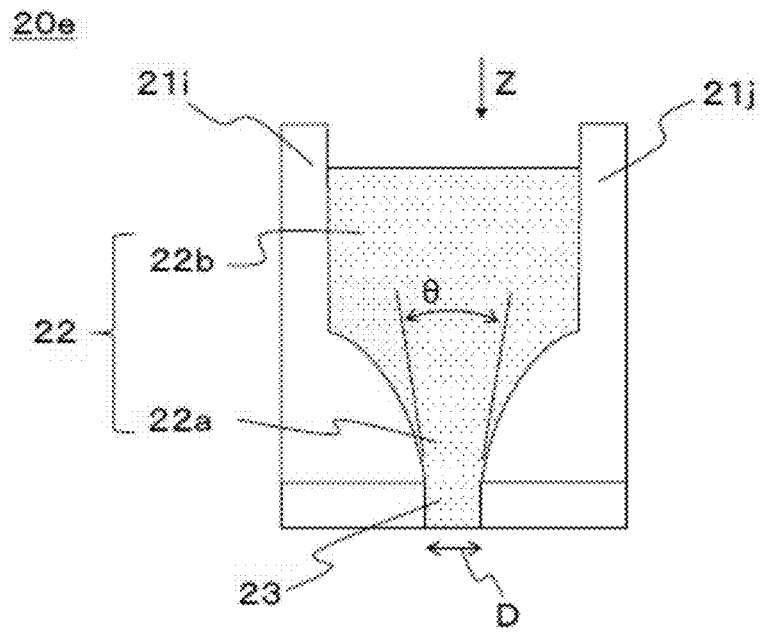
FIG. 11 is a detailed cross-sectional view of the coating section 20e according to an embodiment of the present invention other than in FIG. 8.

FIG. 11 is a detailed cross-sectional view of the coating section 20e according to an embodiment other than in FIG. 8. The coating section 20e is the same as the coating section 20b in FIG. 8 except that wall constituent members 21i and 21j constituting the liquid pool 22 form a trumpet shape (curved shape). In the coating section 20b in FIG. 8, the region 22a whose cross-sectional area decreases continuously in the liquid pool 22 is tapered (linear), but, without limitation to this, may be, for example, in trumpet shape (curved shape) as in FIG. 11. However, the lower portion of the liquid pool 22 and the upper portion of the narrowed section 23 are preferably connected smoothly. This is because any step at the boundary between the lower portion of the liquid pool 22 and the upper portion of the narrowed section 23 causes the reinforcing fiber sheet to be caught by the step, where fuzz will undesirably be generated. In cases where, in this manner, the region whose cross-sectional area decreases continuously in the liquid pool 22 is in trumpet shape, the opening angle θ between the virtual tangent lines of the lowermost region 22a whose cross-sectional area decreases continuously in the liquid pool 22 is preferably an acute angle.

In this regard, the above description illustrates an example in which the cross-sectional area decreases smoothly, but the cross-sectional area of the liquid pool in the present invention does not necessarily need to decrease smoothly, to the extent that the object of the present invention is not impaired.

Figure 12:
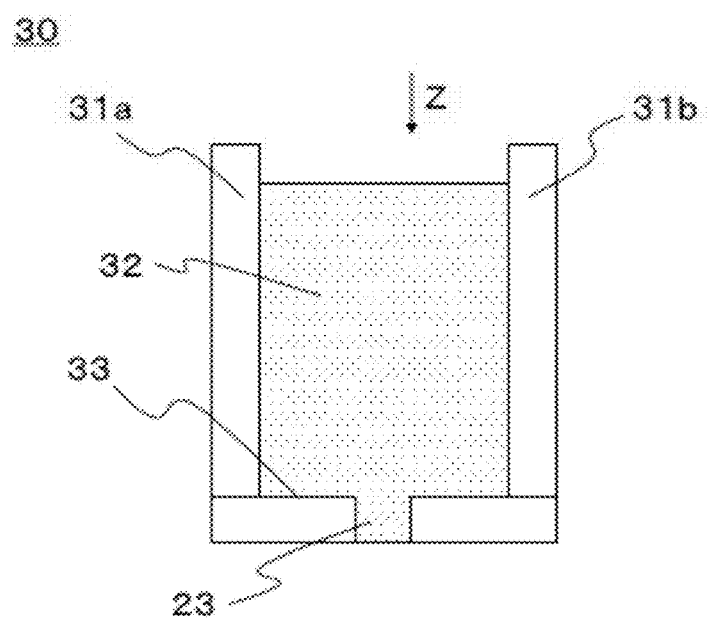
FIG. 12 is a detailed cross-sectional view of the coating section 30 according to an embodiment other than of the present invention.

FIG. 12 is a detailed cross-sectional view of the coating section 30 according to another embodiment. Differently from FIGS. 8 to 11, the liquid pool 32 in FIG. 12 does not contain a region whose cross-sectional area decreases continuously in the vertically downward direction Z, but the liquid pool 32 is configured such that the cross-sectional area decreases discontinuously and suddenly at the boundary 33 with the narrowed section 23. This makes it more likely that the reinforcing fiber sheet or the prepreg causes clogging, and such a configuration is preferably avoided.

<Uniformization of Applied Amount of Matrix Resin>

As detailed above, the amount of the matrix resin 4 applied to the reinforcing fiber sheet 2 depends on the gap D in the narrowed section 23, and thus, it is preferable, from the viewpoint of obtaining the prepreg 3 having uniform quality, to cause the size of the gap D to be uniform in the width direction of the reinforcing fiber sheet 2. In addition, it is preferable, from the viewpoint of continuously producing the prepreg 3 having uniform quality, to cause the size of the gap D to be uniformly maintained over time while the reinforcing fiber sheet 2 is running. Here, the cause of ununiformity generated in the gap D in the narrowed section 23 will be detailed.

Figure 13:
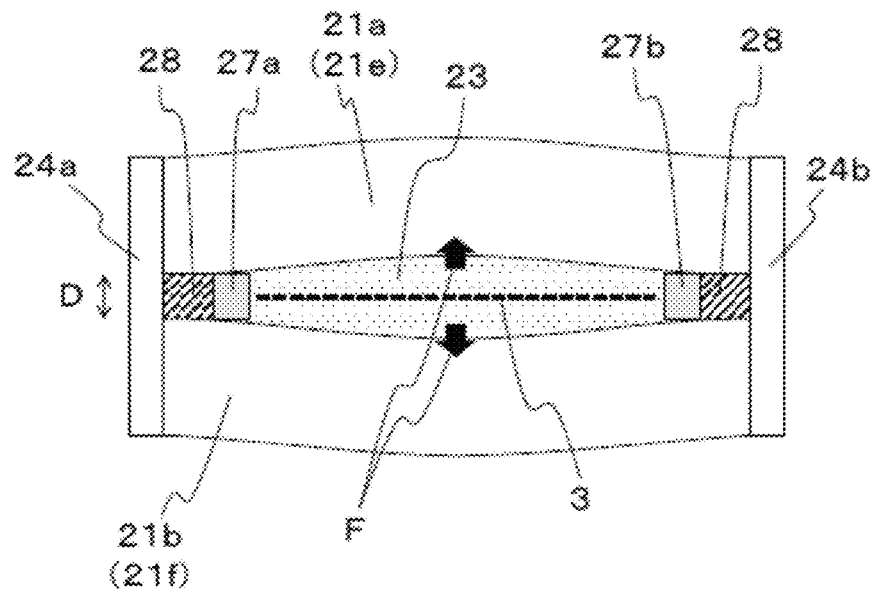
FIG. 13 is a bottom view of a coating section other than in the present invention, wherein the coating section has no external force application mechanism applied thereto.

FIG. 13 is a bottom view of a coating section in an embodiment other than of the present invention, that is, an embodiment in which no external force application mechanism is used, wherein the coating section is viewed in the same direction as A in FIG. 3. As depicted in FIG. 13, the coating section includes width regulation members 27a and 27b and shims 28 in the same manner as in FIG. 7(c), and the wall constituent members 21a and 21b are each tightened with a bolt (not shown) at the portions of shims 28 so as to sandwich the shims 28. Here, the coating section depicted in FIG. 13 includes no external force application mechanism. As detailed above, the running of the reinforcing fiber sheet 2 in the present production method causes a high liquid pressure in the liquid pool 22 and the narrowed section 23. When this takes place, the liquid pressure causes a force F to be applied to the wall constituent members 21a and 21b forming the narrowed section 23 and in the direction for expanding the gap D in the narrowed section 23. The force F acts only on the portion through which the reinforcing fiber sheet 2 passes, and thus, the wall constituent members 21*a* and 21*b* in FIG. 13 are deformed in the direction for opening the gap D at the center of the reinforcing fiber sheet 2 in the width direction with the bolt-tightened positions (the portions of the shims 28) each acting as a fulcrum, and thus cause the gap D in the narrowed section 23 to be ununiform in the width direction. As detailed above, the amount of the matrix resin 4 applied to the reinforcing fiber sheet 2 depends on the size of the gap D, and thus, the gap D ununiform in the width direction causes the amount of the matrix resin 4 applied to the reinforcing fiber sheet 2 to be ununiform in the width direction, thus decreasing the quality of the prepreg 3. The amount of this deformation of the wall constituent members 21*a* and 21*b* caused by the liquid pressure is larger as the viscosity of the matrix resin 4 applied is higher, and also as the running speed of the reinforcing fiber sheet 2 is higher. Furthermore, if the viscosity of the matrix resin 4 changes over time while the reinforcing fiber sheet 2 is running, the degree of the liquid pressure changes over time, thus changing the degree of the ununiformity of the gap D over time and causing the amount of the matrix resin 4 applied to the reinforcing fiber sheet 2 to be changed in the longitudinal direction of the reinforcing fiber sheet 2, and as a result, the quality of the prepreg 3 decreases.

Furthermore, in cases where the matrix resin 4 melted by heating is used, a difference between the temperature of the wall constituent members 21*a* and 21*b* and the temperature of the matrix resin 4 generates a temperature difference inside the wall constituent members 21*a* and 21*b*, causing the wall constituent members 21*a* and 21*b* to be thermally deformed and causing the gap D to be ununiform in the width direction in some cases. In addition, if the temperature of the matrix resin 4 changes over time, the degree of the thermal deformation changes over time, and thus, the gap D in the narrowed section 23 changes over time. Also in this case, the amount of the matrix resin 4 applied to the reinforcing fiber sheet 2 is caused to be ununiform in the width direction over time as above-mentioned, thus decreasing the quality of the prepreg 3.

These amounts of deformation are larger as the width of the wall constituent members 21*a* and 21*b* is larger, that is, as the width of the reinforcing fiber sheet 2 is larger. Thus, the larger the width of the reinforcing fiber sheet 2, the more difficult it is to cause the gap D in the narrowed section 23 to be uniform.

Next, the action of an external force application mechanism in the present invention will be detailed.

Figure 14:
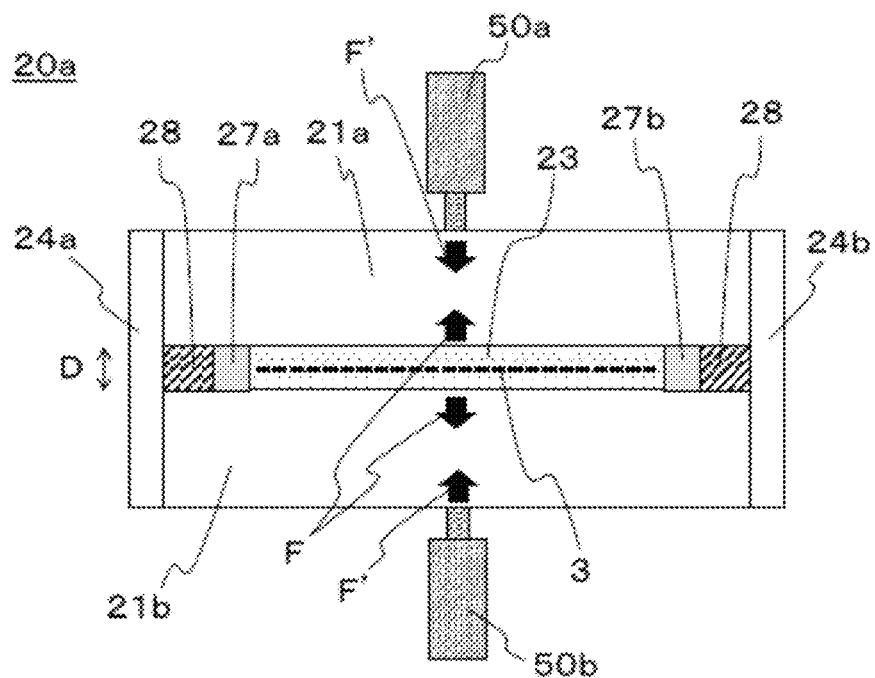
FIG. 14 is a bottom view of the coating section 20a in an example according to an embodiment of the present invention, wherein the coating section has an external force application mechanism applied thereto.
Figure 19:
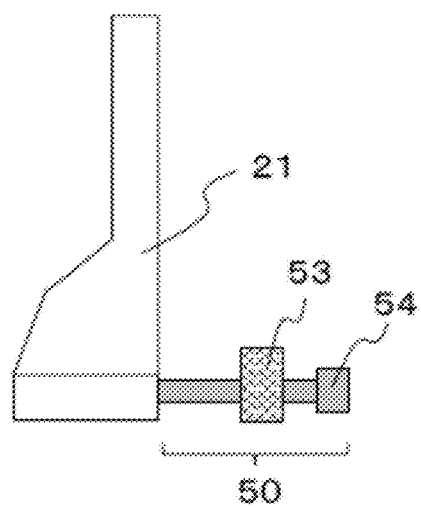
FIG. 19 is a detailed cross-sectional view of an external force application mechanism of an adjusting bolt type.
Figure 20:
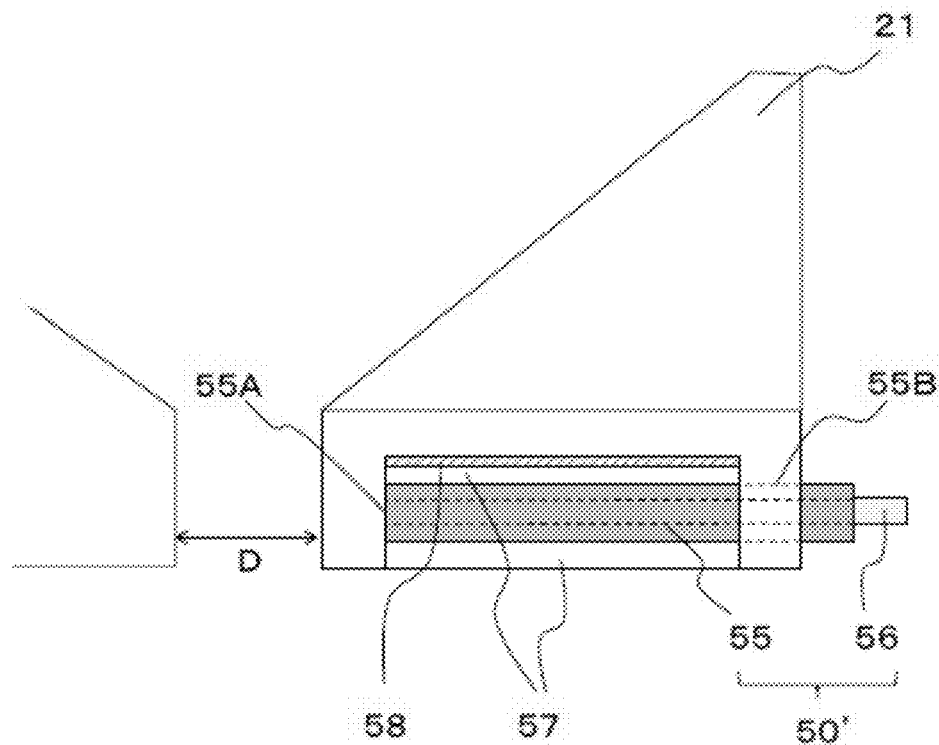
FIG. 20 is a detailed cross-sectional view of an external force application mechanism 50' of a heat bolt type.

FIG. 14 is a bottom view of the coating section in an embodiment of the present invention, as viewed in the direction A in FIG. 3. The coating section in FIG. 14 has external force application mechanisms 50*a* and 50*b* on the centers of wall constituent members 21*a* and 21*b* in the width direction. The external force application mechanisms 50*a* and 50*b* apply an external force to the wall constituent members 21*a* and 21*b* in the thickness direction of the reinforcing fiber sheet 2 (the direction is depicted as being toward the reinforcing fiber sheet in FIG. 14 which is a bottom view). Examples of external force application mechanisms 50 include air cylinders, servomotors, stepping motors, adjusting bolts (set screws), differential screws, heat bolts, and the like, but are not limited to any particular such mechanism provided that such a mechanism can apply an external force to the wall constituent members 21. FIG. 19 is a detailed cross-sectional view of an example of an external force application mechanism 50 of an adjusting bolt type. The external force application mechanism 50 in FIG. 19 is a mechanism that allows an axial force of an adjusting bolt 54 to be applied as an external force to a wall constituent member 21, wherein the axial force is caused by rotating the adjusting bolt 54 that is screwed into a threaded hole made in a fixed base 53 independent from the wall constituent member 21. FIG. 20 is a detailed cross-sectional view depicting an example of an external force application mechanism 50' of a heat bolt type, which is one kind of thermal actuator. The external force application mechanism 50' in FIG. 20 is composed of: a heating element 56 that is a mechanism for generating a temperature change; and a rod 55 that is a member the length of which is changed in an intended direction in accordance with the temperature change. In the drawing, the heating element 56 is incorporated into the rod as shown by the dashed lines in the drawing. The rod 55 and the wall constituent member 21 are bound at the positions 55A and 55B in FIG. 20. The external force application mechanism 50' in FIG. 20 is a mechanism that allows an external force to be applied to the wall constituent member 21, wherein the external force is caused by heating the rod 55 using a heating element 56 to thermally expand the rod 55. When this takes place, that site of the wall constituent member 21 which is bound at the point 55A is pushed leftward at the point 55A at which the wall constituent member 21 and the rod 55 are bound, so that the gap D relative to the opposed wall constituent member can be decreased. Contrarily, in cases where the gap D relative to the opposed wall constituent member is desirably increased, it is only necessary that the output of the heating element 56 is decreased to cool the rod 55, or that a cooling element is used in place of the heating element 56. The rod 55 is not limited to any particular material, and examples of materials that can be used include SUS430 and the like. In addition, the heating element 56 is not limited to any particular type, and examples of elements that can be used include cartridge heaters, sheath heaters, ceramic heaters, and the like. In addition, in cases where the temperature change of the rod 55 is not desired to cause a temperature change to the wall constituent member 21, a void 57 may be formed between the wall constituent member 21 and the rod 55, or a heat insulation material 58 may be provided therebetween, if necessary. In this manner, the external force application mechanism 50' in FIG. 20 makes it possible that the magnitude of the external force is controlled by utilizing the thermal expansion or thermal shrinkage caused by changing the temperature of the rod 55.

Here, regardless of the type, the external force application mechanism may be mounted on the external side of the wall constituent member 21 as in FIG. 19, or may be mounted inside the wall constituent member 21 as in FIG. 20.

Even when the running of the reinforcing fiber sheet 2 generates a high liquid pressure in the liquid pool 22 and the narrowed section 23, causing forces F to be applied to the wall constituent members 21*a* and 21*b* in the direction for expanding the gap D in the narrowed section 23, as in the coating section 20*a* in FIG. 14, the external force application mechanisms 50*a* and 50*b* make it possible that external forces F' are applied in the direction opposed to that of the forces F, thus controlling the deformation of the wall constituent members 21*a* and 21*b* to maintain the gap D in the narrowed section 23 uniformly. In the same manner, even when a difference between the temperature of the wall constituent members 21*a* and the 21*b* and the temperature of the matrix resin 4 causes a temperature difference inside the wall constituent members 21*a* and 21*b*, the external force application mechanisms 50*a* and 50*b* make it possible that external forces are applied in the direction for inhibiting thermal deformation due to the temperature difference, thus controlling the deformation of the wall constituent members 21a and 21b and maintaining the gap D in the narrowed section 23 uniformly. As a result, the gap D in the narrowed section 23 becomes uniform in the width direction, and the amount of the matrix resin 4 applied to the reinforcing fiber sheet 2 becomes uniform in the width direction, thus making it possible to obtain a prepreg 3 having uniform quality in the width direction.

Figure 15:
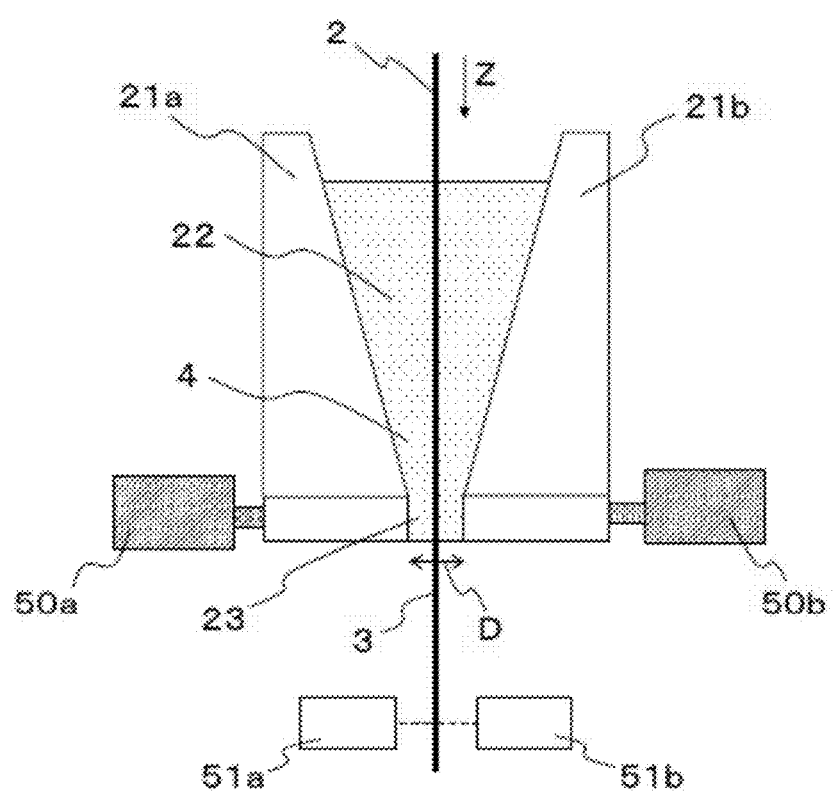
FIG. 15 is a cross-sectional view of a coating section according to an embodiment of the present invention other than in FIG. 14, wherein the coating section has an external force application mechanism applied thereto.

FIG. 15 is a cross-sectional view of a coating section according to an embodiment other than in FIG. 14, wherein the coating section has an external force application mechanism applied thereto. The coating section in FIG. 15 includes measurement devices 51a and 51b that measure the thickness or mass of the prepreg 3 downstream of the coating section. In this manner, it is preferable that the thickness or mass of the prepreg 3 which has undergone coating is measured, and that the measured value is used to control the magnitude and direction of an external force to be applied by the external force application mechanisms 50a and 50b, thus making it possible to obtain the prepreg 3 coated with the matrix resin 4 uniformly. More specifically, for example, a plurality of external force application mechanisms 50 are mounted in the width direction of the prepreg 3 (in the depth direction of the page of FIG. 15), and furthermore, the thickness or mass of the prepreg 3 is measured over the full width while measurement devices 51 are reciprocated in the width direction of the prepreg 3. At a position at which the thickness or mass of the prepreg 3 is larger than a prescribed value, the magnitude and direction of an external force applied to the wall constituent members 21a and 21b can be controlled so that the external force application mechanisms 50 can decrease the gap D. This makes it possible that the wall constituent members 21 are deformed to decrease the gap D at the position and decrease the amount of the applied matrix resin 4 so that the thickness or mass of the prepreg 3 can be within the prescribed value. Contrarily, at a position at which the thickness or mass of the prepreg 3 is smaller than a prescribed value, the magnitude and direction of an external force applied to the wall constituent members 21a and 21b can be controlled so that the external force application mechanisms 50 can increase the gap D. Controlling the magnitude of such an external force causes the gap D in the narrowed section 23 to become uniform, and causes the amount of the matrix resin 4 applied to the reinforcing fiber sheet 2 to become uniform, thus making it possible to obtain a prepreg 3 having uniform quality.

Here, the coating section depicted in FIG. 15 is shown as an example in which the thickness or mass of the prepreg 3 is measured over the full width while the measurement devices 51a and 51b are reciprocated in the width direction of the prepreg 3, but without limitation to this, for example, a plurality of measurement devices 51 may be mounted in the width direction of the prepreg 3 so that the thickness or mass of the prepreg 3 can be measured at a plurality of positions in the width direction of the prepreg 3.

In addition, such an external force applied to the wall constituent member 21 by the external force application mechanism 50 is not limited to any particular control method. For example, the thickness or mass of the prepreg 3 may be regularly measured by the measurement device 51 to output a control signal so that an external force can be applied only in cases where the measured value falls outside a specified range, or the thickness or mass of the prepreg 3 may always be measured by the measurement device 51 to control and feed back the magnitude of the external force so that the measured value can always approach the specified value.

Examples of measurement devices 51a and 51b for measuring the thickness and mass of a prepreg include β-ray gauges, X-ray gauges, and the like, but are not limited to any particular measurement device provided that such a device can measure the thickness or mass of the prepreg 3.

Figure 16:
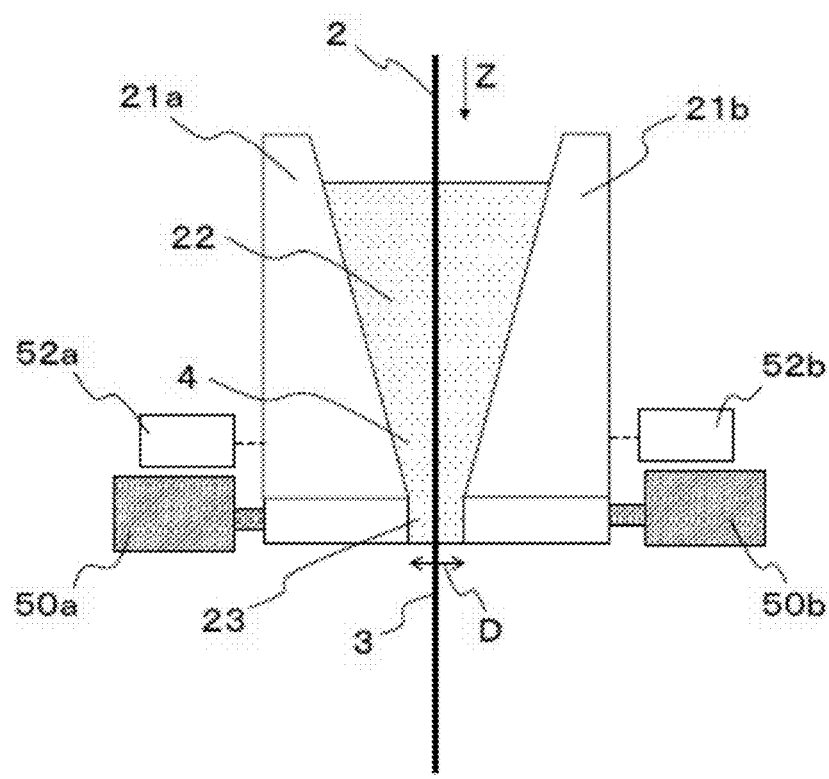
FIG. 16 is a cross-sectional view of a coating section according to an embodiment of the present invention other than in FIG. 15, wherein the coating section has an external force application mechanism applied thereto.

FIG. 16 is a cross-sectional view of a coating section according to an embodiment other than in FIG. 15, wherein the coating section has an external force application mechanism applied thereto. The coating section in FIG. 16 includes, apart from the external force application mechanisms 50a and 50b, measurement devices 52a and 51b for measuring the amount of deformation of the wall constituent members 21a and 21b. Also in this manner, it is preferable that the amount of deformation of the wall constituent members 21a and 21b is measured, and that the measured value is used to control the magnitude of an external force to be applied by the external force application mechanisms 50a to 50f, thus making it possible to make the gap D in the narrowed section 23 uniform. More specifically, for example, measurement devices 52a and 52b are mounted in the vicinity of the external force application mechanisms 50a and 50b respectively, and the size of the gap D is preliminarily measured and made uniform in the width direction before the reinforcing fiber sheet 2 is run. Using the thus determined positions of the wall constituent members 21a and 21b as the bases, the magnitudes of external forces applied by the external force application mechanisms 50a and 50b can be controlled in such a manner that the amounts of deformation of the wall constituent members 21a and 21b become zero respectively at the positions of the measurement devices 52a and 52b respectively while the reinforcing fiber sheet 2 is running. For example, in cases where the deformation is measured by the measurement device 52a in the direction in which the wall constituent member 21a comes apart from the reinforcing fiber sheet 2, the magnitude of the external force applied by the external force application mechanism 50a can be controlled in the direction for causing the wall constituent member 21a to approach the reinforcing fiber sheet 2. Here, for explanation purposes, the coating section in FIG. 16 is depicted in such a manner that the external force application mechanisms 50a and 50b are positioned vertically higher than the narrowed section 23, but, from the viewpoint of controlling the size of the gap D in the narrowed section 23 precisely, it is preferable that the measurement devices 52a and 52b are mounted vertically at the same height as the narrowed section 23. In addition, the measurement devices 52a and 52b are preferably mounted as near the external force application mechanisms 50a and 50b as possible from the viewpoint of precisely controlling the magnitudes of external forces applied by the external force application mechanisms 50a and 50b.

Examples of the measurement device 52 include contact displacement gauges, noncontact laser displacement gauges, and the like, but are not limited to any particular measurement device provided that such a measurement device can measure the amount of deformation of the wall constituent member 21.

Figure 17:
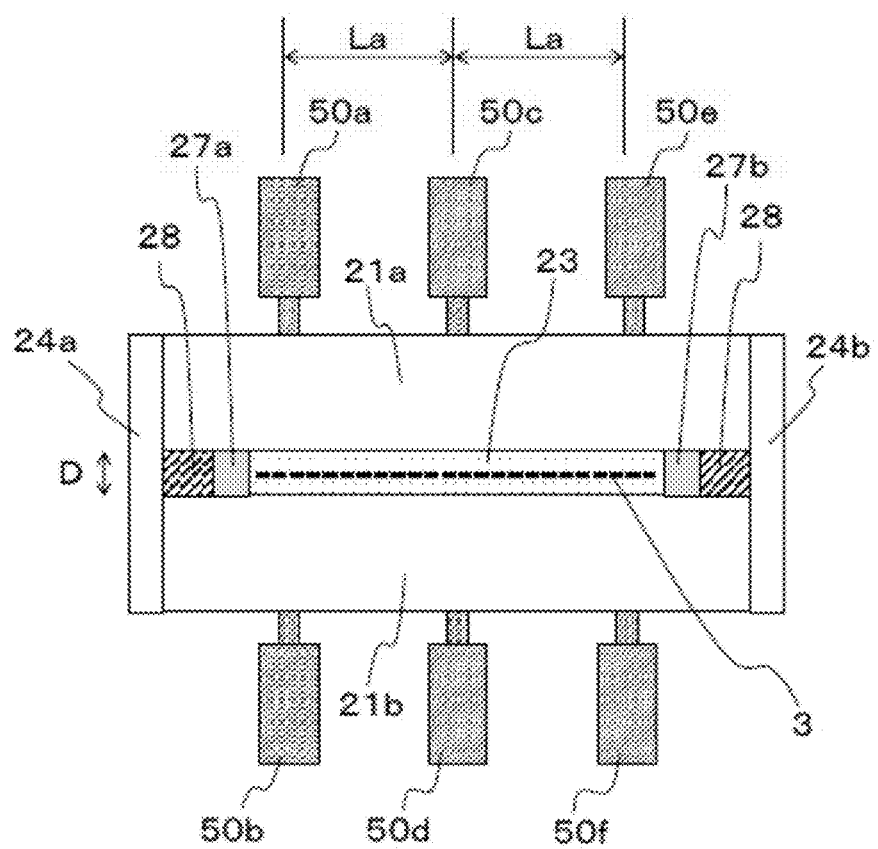
FIG. 17 is a bottom view of a coating section according to an embodiment of the present invention other than in FIG. 14, wherein the coating section has an external force application mechanism applied thereto.

FIG. 17 is a bottom view of a coating section according to an embodiment other than in FIG. 14, wherein the coating section has an external force application mechanism applied thereto. As depicted here, mounting external force application mechanisms at a plurality of positions in the width direction of the reinforcing fiber sheet 2 enables the gap D to be more finely controlled in the width direction of the reinforcing fiber sheet 2, and thus, is preferable. In particular, causing the spacing (La) between adjacent external force application mechanisms to be 150 mm or less makes it possible to control the thickness of a prepreg more uniformly, and thus, is preferable. In this case, the magnitudes of external forces needed to control the deformation of the wall constituent members 21a and 21b and uniformize the gap D in the narrowed section 23 differ in accordance with the positions of the external force application mechanisms 50a to 50f in some cases, and thus, it is more preferable to separately control the magnitudes of the external forces applied by the external force application mechanisms 50a to 50f.

In addition, from the viewpoint of controlling the deformation of each of the wall constituent members 21a and 21b to uniformize the gap D in the narrowed section 23, it is preferable to mount an external force application mechanism 50 on each of the wall constituent members 21a and 21b opposed to each other, and to apply an external force to each of the wall constituent members 21a and 21b. Also in this case, the magnitudes of external forces needed to control the deformation of the wall constituent members and uniformize the gap D in the narrowed section 23 differ between the wall constituent members 21a and 21b in some cases, and thus, it is more preferable to independently control the magnitude of the external force applied to each of the external force application mechanisms 50.

As above-mentioned, controlling the magnitude of the external force to control the deformation of the wall constituent members 21 so that the gap D in the narrowed section 23 can be uniform over time in the width direction of the reinforcing fiber sheet 2 makes it possible that the amount of the matrix resin 4 applied to the reinforcing fiber sheet 2 is uniform in the width direction and running direction of the reinforcing fiber sheet 2, and that a prepreg 3 having uniform quality in the width direction and running direction is obtained.

<Running Mechanism>

Known rollers or the like can suitably be used as a running mechanism for conveying a reinforcing fiber sheet and the prepreg according to the present invention. In the present invention, the reinforcing fiber sheet is conveyed substantially vertically downward, and accordingly, the rollers are preferably disposed above and below the coating section, which is between the rollers.

In addition, it is preferable in the present invention that the running pathway of the reinforcing fiber sheet is as linear as possible in order to suppress arrangement disturbance and fuzzing of the reinforcing fibers. Additionally, in a step of conveying a sheet-like integrated object that is a laminate of a prepreg and a release sheet, it is preferable that the running pathway of the sheet-like integrated object is also as linear as possible, because a bend, if any, in the conveying step generates wrinkles due to a perimeter difference between the inner layer and the outer layer in some cases. From this viewpoint, nip rolls are more preferably used in the running pathway of the sheet-like integrated object.

Which of S-shaped arranged rolls and nip rolls should be used can suitably be determined in accordance with the production conditions and the product characteristics.

<High Tension Take-Up Device>

In the present invention, it is preferable that a high tension take-up device for withdrawing the prepreg from the coating section is disposed downstream of the coating section in the process. This is because high friction force and shearing stress are generated between the reinforcing fiber sheet and the matrix resin in the coating section, and accordingly, it is preferable that high take-up tension is generated downstream in the process, in order to overcome the high friction force and the shearing stress and withdraw the prepreg. As a high tension take-up device, nip rolls, S-shaped arranged rolls, and the like can be used, and in any case thereof, enhancing friction force between the rolls and the prepreg can prevent slip and achieve stable running. To achieve this, it is preferable to arrange a high friction coefficient material on the surface of the roll, increase the nip pressure, or increase the pressing pressure of the prepreg against the S-shaped arranged rolls. The S-shaped arranged rolls make it possible to more easily control friction force on the basis of the roll diameter and the contact length, and accordingly, are more preferable, from the viewpoint of preventing slip.

<Release Sheet Supply Device and Winder>

A release sheet supply device and a winder can suitably be used in producing prepreg or FRP using the present production method. As such a device, any known one can be used, and in any case, it is preferable from the viewpoint of running the sheet stably that such a device includes a mechanism for making it possible to feed an unwinding or wind-up tension back to the unwinding or wind-up speed.

<Additional-Impregnation>

In order to make adjustments to a desired degree of impregnation, it is possible to further combine a means for enhancing the degree of impregnation using an impregnation device after a matrix resin is applied. Here, to distinguish this means from the impregnation in the coating section, such an impregnation process additionally carried out after coating is referred to as an additional-impregnation process, and a device for an additional-impregnation process is referred to as an additional-impregnation device. A device used as an additional-impregnation device is not limited to a particular one, and can suitably be selected from known ones in accordance with the purpose. For example, as described in JP2011-132389A and WO2015/060299, impregnation can be promoted by preheating a laminate of a reinforcing fiber sheet and a resin on a hot plate and sufficiently softening the resin on the sheet-like carbon fiber bundle, followed by using a device for pressing with nip rolls which are also heated. The hot plate temperature and nip roll surface temperature for preheating, the linear pressure of the nip rolls, and the diameter and number of the nip rolls can suitably be selected so as to achieve a desired degree of impregnation. Alternatively, it is also possible to use such "S-wrap rolls" as described in WO2010/150022, wherein a prepreg sheet runs in S-shape through the S-wrap rolls. In the present DESCRIPTION, "5-wrap rolls" are simply referred to as "S-shaped arranged rolls". FIG. 2 in WO2010/150022 describes an example in which a prepreg sheet runs in S-shape, but the contact length between the sheet and the roll may be adjusted in U-shape, V-shape, or A-shape as long as impregnation can be carried out. In addition, opposing contact rolls can be added in cases where the impregnation pressure is increased to enhance the degree of impregnation. Furthermore, as described in FIG. 4 in WO2015/076981, it is also possible to attempt to increase the production speed of prepreg by arranging a conveyor belt opposite to "S-wrap rolls" and thereby enhancing impregnation efficiency. Alternatively, as described in WO2017/068159, JP2016-203397A, and the like, it is also possible to enhance impregnation efficiency by subjecting prepreg to ultrasonication to heat the prepreg rapidly before impregnation. Alternatively, as described in JP2017-154330A, it is also possible to use an impregnation device in which a plurality of "squeeze blades" are vibrated by an ultrasonic generator. Alternatively, as described in JP2013-22868A, it is also possible to fold up a prepreg and carry out impregnation.

<Simplified Additional-Impregnation>

The above description shows an example in which a conventional additional-impregnation device is applied, but, in some cases, the temperature of the prepreg is still high immediately under the coating section, and in such cases, it is also possible to simplify and make smaller an impregnation device significantly by adding an additional-impregnation operation at a stage where time has not yet elapsed very much after the prepreg exits from the coating section, thereby omitting or simplifying a heating device such as a hot plate for heating the prepreg again. An impregnation device positioned immediately under the coating section is referred to as a simplified additional-impregnation device. As a simplified additional-impregnation device, heated nip rolls and heated S-shaped arranged rolls can be used. Compared with a usual impregnation device, they make it possible not only to decrease the roll diameter, the set pressure, and the contact length between the prepreg and the rolls, thereby enabling the device to be smaller, but also to decrease the power consumption, and accordingly, are preferable.

In addition, applying a release sheet to the prepreg before the prepreg enters the simplified additional-impregnation device enhances the running properties of the prepreg, and accordingly, is preferable.

<Prepreg Width>

In addition, a method of obtaining a prepreg having a desired width is not limited to a particular one, and a method in which a broad prepreg having a width of approximately 1 m to approximately 2 m is slit into narrow prepregs can be used. Alternatively, in order to simplify or omit the slitting step, the width of the coating section used in the present invention can be adjusted so as to be a desired width from the beginning. For example, in cases where a narrow prepreg having a width of 30 cm is produced for ATL, the width of the outlet of the coating section can be adjusted in accordance with the former width. Further in order to produce this prepreg efficiently, it is preferable to produce a product having a width of 30 cm, and juxtaposing a plurality of such production apparatuses enables prepregs to be produced in a plurality of lines using the same running devices, conveyance devices, various rolls, and winders.

In addition, prepreg tapes can be obtained by forming a reinforcing fiber sheet from approximately one yarn to three yarns of tape-like reinforcing fiber bundles and allowing the resulting reinforcing fiber sheet to pass through the coating section the width of which is adjusted to afford a desired tape width. For prepreg tapes, particularly the accuracy of the tape width is often required, from the viewpoint of controlling cross-directional overlapping between the tapes. Because of this, it is preferable to control the coating section outlet width more strictly, and in this case, it is preferable that the above-mentioned L, L2, and W satisfy the relationship(s) of L≤W+1 mm and/or L2≤W+1 mm.

In embodiments of the present invention, the degree of impregnation of a coating liquid is desirably 10% or more. As to the degree of impregnation of a coating liquid, a sampled prepreg can be torn off so that the inside of the prepreg can be visually checked to see whether the prepreg has been impregnated. More quantitatively, the degree of impregnation can be evaluated, for example, by a peeling method. Measuring the degree of impregnation of the coating liquid by a peeling method can be carried out in the following manner. That is, a sampled prepreg is sandwiched between adhesive tapes, these are peeled off, and the reinforcing fiber to which the coating liquid has stuck and the reinforcing fiber to which the coating liquid has not stuck are separated. Then, the ratio of the mass of the reinforcing fiber to which the coating liquid has stuck to the mass of the whole reinforcing fiber sheet that has been used can be regarded as a degree of impregnation of the coating liquid based on a peeling method.

<Slit>

The method of slitting prepreg is not limited to a particular one, and a known slitting device can be used. A prepreg may be slit after the prepreg is once wound up and separately mounted in a slitting device, or, to obtain efficiency, a slitting step may be disposed continuously after a prepreg production step without once winding up the prepreg. In addition, the slitting step may be a step in which a 1 m or more broad prepreg is directly slit into prepregs having a desired width, or once cut and split into approximately 30 cm narrow prepregs, which are then slit again into prepregs having a desired width.

Here, in cases where the above-mentioned plurality of coating sections for narrow prepregs or prepreg tapes are juxtaposed, the respective independent release sheets may be supplied, or a plurality of prepreg sheets may be laminated on one broad release sheet that has been supplied. The width direction edges of the prepreg thus obtained can be cut off and supplied into an ATL or AFP device. In this case, the major part of the edges to be cut off is from the release sheet, and accordingly, the amount of the coating liquid component (the resin component in the case of CFRP) sticking to the slit cutter blade can be decreased, resulting in being also advantageous in that the cleaning cycle for the slit cutter blade can be extended.

<Matrix Resin Supply Mechanism>

In the present production method, the matrix resin is stored in the coating section, but it is preferable to replenish the matrix resin suitably because the coating progresses. The mechanism for supplying the coating section with a matrix resin is not limited to a particular one, and a known device can be used. Supplying the coating section with a matrix resin continuously makes it possible not to disturb the liquid surface at the top of the coating section and to stabilize the running of the reinforcing fiber sheet, and accordingly, is preferable. For example, the coating liquid can be supplied by its own weight as a driving force from a vessel storing the coating liquid, or supplied continuously using a pump or the like. As a pump, a gear-pump, tube pump, pressure pump, and the like can suitably be used in accordance with the properties of the coating liquid. In addition, in cases where the matrix resin is solid at room temperature, a melter is preferably provided at the upper portion of the storage vessel. In addition, a continuous extruder and the like can be used. As to the supply amount of the coating liquid, a mechanism for enabling the coating liquid to be supplied continuously in accordance with the coating amount is preferably provided so that the liquid level of the coating liquid in the upper portion in the coating section can be as constant as possible. For this, for example, a mechanism in which the liquid level and the coating section weight are monitored and fed back to a supply device is conceivable.

<On-Line Monitoring>

In addition, a mechanism for allowing the coating amount to be monitored on-line is preferably provided in order to monitor the coating amount. The on-line monitoring method is not limited to a particular one, and a known one can be used. For example, as a device for thickness measurement, for example, a β-ray gauge can be used. In this case, the coating amount can be estimated by measuring the thickness of a reinforcing fiber sheet and the thickness of a prepreg and analyzing the difference between the thicknesses. The coating amount monitored on-line can immediately be fed back to the coating section, and utilized to adjust the temperature of the coating section and the gap D in the narrowed section 23 (see FIG. 3). Needless to say, the coating amount monitoring can be used as defect monitoring. As to the thickness measurement position, for example, in FIG. 2, the thickness of the reinforcing fiber sheet 416 can be measured in the vicinity of the diverting roll 419, and the thickness of the prepreg 471 can be measured between the coating section 430 and the diverting roll 441. In addition, on-line defect monitoring is preferably carried out using infrared, near-infrared, camera (image analysis), and the like.

EXAMPLES

Next, specific examples of embodiments of the present invention will be described with reference to Examples. However, the present invention is not construed to be limited to the below-mentioned Examples.

Table 1 tabulates the results obtained by carrying out the experiments in which a molten resin was applied as a matrix resin 4 to a reinforcing fiber sheet 2 to produce a prepreg 3 for CFRP.

First, common experimental conditions will be detailed.

(1) Prepreg Production Apparatus

In any of Examples and Comparative Examples, a prepreg production apparatus in FIG. 2 (although the depiction of a resin supply section is omitted) was used, and the wall constituent members used for the coating section were the wall constituent members 21e and 21f shaped as in FIG. 9. Stainless steel blocks were used as the wall constituent members, and stainless steel plates were used as the side plate members. Furthermore, width regulation mechanisms 27a and 27b and shims 28 were used for the coating section as depicted in FIG. 7, the spacing L2 between the width regulation mechanisms 27a and 27b was 300 mm, and the shim 28 had a thickness of 0.2 mm. That is, the outlet of the narrowed section 23 was a slit having a width of 300 mm and a gap of 0.2 mm, and the aspect ratio was 1500. Each shim 28 was tightened with a bolt (not shown) at the portion of the shim 28 so as to be sandwiched between the wall constituent members 21. In addition, the space external to each bush was closed off at the bottom outlet of the narrowed section so that the coating liquid could not leak through the outlet of the narrowed section. The liquid pool was tapered in two tiers as depicted in FIG. 9, the opening angle of the upper taper was 17°, the opening angle of the lower taper was 7°, and the tapers had a total height (i.e., H) of 100 mm. In addition, the thickness M of each of the wall constituent members 21e and 21f was 75 mm at its bottom end (on the outlet side). Furthermore, to heat the matrix resin, a plate-heater was attached to the periphery of each of the wall constituent members 21e and 21f and the side plate members 24a and 24b (although the plate-heater is not shown), and the temperature of the coating liquid (matrix resin) was maintained at 90° C. using a thermocouple to make a temperature measurement.

(2) Reinforcing Fiber Sheet

The above-mentioned apparatus was used to produce a prepreg for CFRP, using, as a reinforcing fiber sheet, a UD base material formed by arranging carbon fibers ("TORAYCA" (registered trademark) T800S (24K), manufactured by Toray Industries, Inc.) from 58 bobbins, and using the below-mentioned thermosetting epoxy resin composition as a matrix resin.

(3) Matrix Resin This is a mixture of an epoxy resin (a mixture of an aromatic amine type of epoxy resin and a bisphenol type of epoxy resin), a hardener (diaminodiphenyl sulfone), and polyethersulfone; containing no polymer particles. The viscosity of this thermosetting epoxy resin 1 was measured using the ARES-G2 manufactured by TA Instruments, Inc. at a measurement frequency of 0.5 Hz at a temperature ramp rate of 1.5° C./minute and was found to be 15 Pa·s at 90° C.

(4) Method of Producing Prepreg

The reinforcing fibers withdrawn from a plurality of reinforcing fiber bobbins fit onto the creels were formed into the reinforcing fiber sheet in the reinforcing fiber arrangement device, and the resulting reinforcing fiber sheet was once introduced upward by the diverting rolls 419. Then, the reinforcing fiber sheet was conveyed vertically downward via a diverting roll, and preheated by a preheating device up to a temperature equal to or greater than the temperature of a matrix resin stored in a coating section. Then, the reinforcing fiber sheet was introduced into the coating section, and coated and impregnated with the matrix resin in the coating section to form a prepreg. The running speed of the reinforcing fiber sheet passing through the coating section was 20 m/minute. The prepreg was laminated, on a diverting roll, with a release sheet unwound from a release sheet (upper) supply device, and taken up by high tension take-up S-shaped arranged rolls. At the same time, the resulting prepreg was laminated, on high tension take-up S-shaped arranged rolls, with a release sheet unwound from a release sheet (lower) supply device, so that release sheets were arranged on both upper and lower faces of the prepreg. Then, the resulting prepreg was supplied into an additional-impregnation device, and preheated by hot plates, followed by carrying out an additional-impregnation process using heated nip rolls. Then, the resulting prepreg was cooled by a cooling device, and then, passed a take-up device. The upper release sheet was peeled away, and the prepreg/release sheet was wound up in roll form by a winder.

Next, the evaluation methods used in Examples and Comparative Examples will be described.

The evaluation methods were each carried out as below-mentioned. In any of the evaluation methods, "A", "B", and "C" were regarded as acceptable, and "D" was regarded as unacceptable. Here, "A" is best, "B" is second to "A", and "C" is second to "B".

[Running Stability]

To evaluate the running stability (continuous production properties) of a reinforcing fiber sheet in a coating liquid application section, the reinforcing fiber sheet was run continuously for 60 minutes. A sheet which caused no fuzz clogging or yarn breaking at all was rated as "A". A sheet was rated "B", wherein the sheet was run continuously for 60 minutes, and caused no fuzz clogging or yarn breaking, but caused fuzz that was visually observable in the coating liquid after the coating section was dismantled so that the liquid contact face of the wall constituent member could be visually observed. A sheet which caused fuzz clogging and yarn breaking was rated as "D".

[Folding of Fiber Bundle]

A reinforcing fiber sheet which did not exhibit any edge folding or deformation at all was rated as "A"; a sheet which occasionally exhibited a little edge folding or deformation, but to an unproblematic degree, was rated as "B"; a sheet which exhibited problematic edge folding or deformation in a period of 30 minutes or less in the 60-minute continuous running was rated as "C"; and a sheet which exhibited problematic edge folding or deformation in a period of 30 minutes or more in the 60-minute continuous running was rated as "D".

[Areal Weight in Width Direction]

A prepreg was cut in the width direction (in the direction perpendicular to the running direction of the sheet) into a strip, 25 mm in width×200 mm in length. When this was done, the lengthwise direction was made equal to the running direction of the sheet. The mass of the applied coating liquid contained in the obtained strip-shaped sheet, that is, the mass of the components other than the reinforcing fiber sheet, was measured to the third decimal place by an electronic balance to obtain the mass of the resin composition. This mass was divided by the area (0.005 m$^2$) of the strip to obtain the areal weight of the applied coating liquid per 1 m$^2$. This operation was repeated from one end of the prepreg to the other, and the average value, maximum value, and minimum value of the areal weights of the obtained resin composition, excluding those of both ends, were determined, and the calculation "(maximum value−minimum value)/average value" was carried out to determine the dispersion of the areal weight. This operation was carried out at 1 m intervals in the longitudinal direction three times in total, and the average value of dispersion of the areal weight determined in each operation was regarded as the dispersion of the areal weight of the prepreg in the width direction. For example, 14 strip-shaped samples can be obtained from a prepreg 350 mm in width, and 12 samples thereof, excluding two both ends, are used to determine the values. The result of more than 20% was rated as "D"; more than 10% and 20% or less as "B"; and 10% or less as "A".

Example 1

Figure 18:
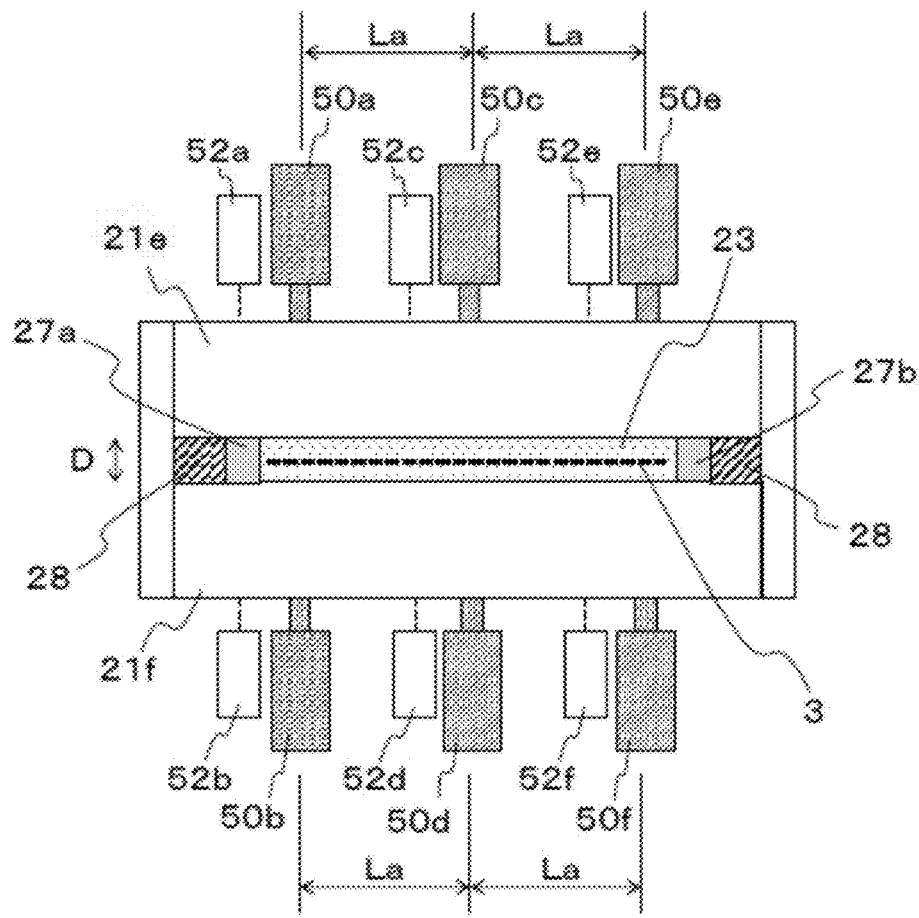
FIG. 18 is a bottom view of a coating section used in Example 1 according to the present invention, wherein the coating section had an external force application mechanism applied thereto.

In the present Example, a prepreg was produced using the external force application mechanisms 50a to 50f totaling six units, three each in the width direction on the wall constituent members 21e and 21f, as shown FIG. 18. Out of these, the external force application mechanisms 50c and 50d were disposed so as to match the center of the wall constituent members 21e and 21f respectively in the width direction and the center of the narrowed section in the width direction, and the spacing (La) between adjacent external force application mechanisms was 100 mm. In addition, external force application mechanisms 50 of an adjusting bolt type shown in FIG. 19 were used as the external force application mechanisms 50a to 50f in the present Example. Furthermore, in the vicinity of the external force application mechanisms 50a to 50f, contact displacement gauges (dial gauges manufactured by Mitutoyo Corporation) were mounted as measurement devices 52a to 52f respectively for measuring the amount of deformation of the wall constituent members 21e and 21f. In the present Example, the positions of the wall constituent members 21e and 21f held before running the reinforcing fiber sheet 2 were used as the zero point on the displacement gauge to control the magnitudes of the external forces applied by the external force application mechanisms 50a to 50f, in such a manner that the value on the displacement gauge became zero while the reinforcing fiber sheet 2 was running. Next, the produced prepreg 3 was cut by 100 mm in the running direction, and the cut-out sample was further cut into three pieces in the width direction to produce three prepreg sheets, 100 mm×100 mm each. Next, the mass of each of the prepreg sheets was measured to calculate the width-directional dispersion of the mass. The width-directional dispersion of the mass was a value (%) obtained by dividing a difference by the average of the mass values of the three prepreg sheets, wherein the difference is obtained by subtracting the minimum from the maximum of the mass values of the three prepreg sheets.

The width-directional dispersion of the mass of the prepreg 3 produced in the present Example was evaluated with the result that the mass at the width-directional center was slightly larger than the mass at the width-directional end, and that the width-directional dispersion of the mass values of the three prepreg sheets was 1.0%.

Comparative Example 1

A prepreg 3 was produced in the same manner as in Example 1 except that no external force application mechanism was used (see FIG. 13). The width-directional dispersion of the mass of the produced prepreg 3 was evaluated in the same manner as described in Example 1 with the result that the mass at the width-directional center was quite larger than the mass at the width-directional end, and that the width-directional dispersion of the three prepreg sheets was 6.2%.

TABLE 1

| | | Example 1 | Comparative Example 1 |
|---|---|---|---|
| Performing Conditions | External Force Application Mechanism | Yes | No |
| | Control of External Force by Measurement Device | Yes | No |
| Evaluation Items | Width-directional Dispersion of Mass of Prepreg | 1.0% | 6.2% |

An example in which a coating liquid (matrix resin) was applied to a reinforcing fiber sheet 2 to produce a prepreg 3 for CFRP is described in Examples 2 to 14 and Comparative Example 2 in which an external force application mechanism 50' of a heat bolt type depicted in FIG. 20 was used, and in Comparative Example 3 in which no external force application mechanism was used. The results are listed in Tables 2 to 5.

Example 2

Figure 21:
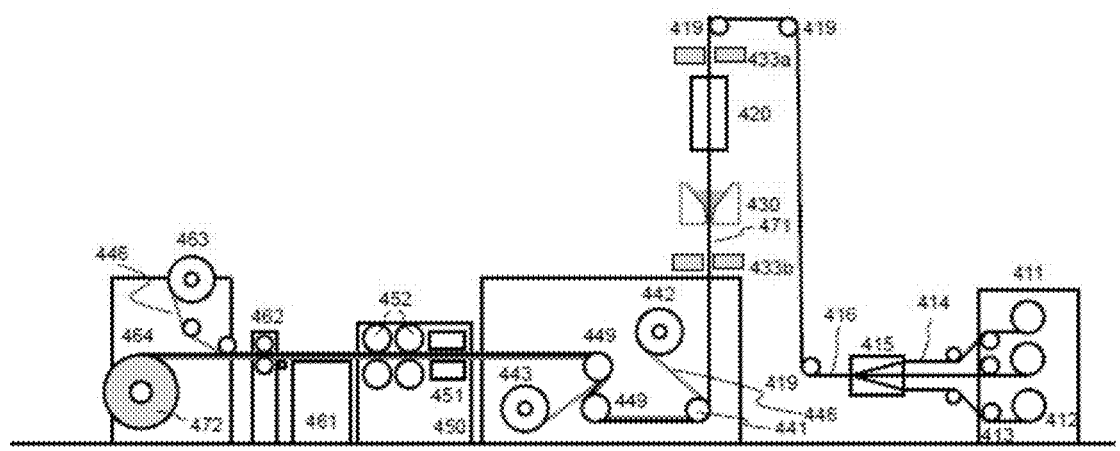
FIG. 21 is a schematic diagram according to a method of producing a prepreg in an embodiment other than in FIG. 1.

The coating section 20c of the type depicted in FIG. 9 was used as a coating section, and an apparatus configured as depicted in FIG. 2 and further including a thickness gauge (see FIG. 21; the same in Examples 3 to 13 and Comparative Examples 2 and 3) was used as an apparatus for producing a prepreg. The liquid pool 22 was tapered (the opening angle of the upper taper was 17°, and the opening angle of the lower taper was) 7°. However, the width of the outlet of the narrowed section was 306 mm. In this regard, the gap D in the narrowed section 23 was 0.2 mm, and thus, the aspect ratio of the outlet slit was 1530. In addition, 15 external force application mechanisms of a heat bolt type having a structure depicted in FIG. 20 were mounted at 20 mm intervals on each side of the narrowed section, which was thus sandwiched by the mechanisms (see FIG. 18). A column having a diameter of 10 mm and made of SUS430 (having a thermal conductivity of 15 W/m·° C.) was used as a rod 55 of the external force application mechanism, and a cartridge heater was used as a heating element 56.

A prepreg was produced in the same manner as described in the above-mentioned (4) except that the number of reinforcing fiber yarn bundles that were withdrawn was 56 in production of the prepreg.

In this regard, β-ray thickness gauges were used as thickness gauges 433a and 433b; before and after coating, the thickness was measured using the thickness gauges 433b and 433a in parallel with the production of the prepreg; the areal weight of the applied coating liquid was determined from the difference in thickness; the amount of heating (or the amount of cooling) generated by a heating element of the external force application mechanism was adjusted in accordance with a difference from the target areal weight to expand or shrink the rod so as to adjust the gap D. The results for some kinds of evaluation items for stable running are listed in Table 2.

Examples 3 to 9

A prepreg was produced and evaluated in the same manner as in Example 2 except that the number of external force application mechanisms and the spacing therebetween were changed as in Table 2. At any level, it was possible to take a sample which was rated as usable or better. The results are shown in Table 2.

Comparative Example 2

A prepreg was produced and evaluated in the same manner as in Example 2 except that a coating section 30 configured as depicted in FIG. 12 was used. Immediately after the sheet started running, the reinforcing fiber sheet 2 was broken in the coating section 30 and became unable to

TABLE 2

|  |  | Example 2 | Example 3 | Example 4 | Example 5 |
|---|---|---|---|---|---|
| Performing Conditions | Running Direction of Reinforcing Fiber Sheet | Vertical (Downward) | Vertical (Downward) | Vertical (Downward) | Vertical (Downward) |
|  | Continuously Decreased Cross-sectional Area in Liquid Pool | Yes | Yes | Yes | Yes |
|  | Width of Outlet of Narrowed Section L2 (mm) | 306 | 306 | 306 | 306 |
|  | L2 - W (mm) | 6 | 6 | 6 | 6 |
|  | External Force Application Mechanism of Heat Bolt Type — Yes or No | Yes | Yes | Yes | Yes |
|  | Number of Mechanisms Mounted on One Face | 15 | 12 | 10 | 8 |
|  | Spacing between External Force Application Mechanisms (La) (mm) | 20 | 26 | 31 | 38 |
| Evaluation Items | Running Stability (Continuous Production Properties) | A | A | A | A |
|  | Width-directional Areal Weight | A | A | A | B |

|  |  | Example 6 | Example 7 | Example 8 | Example 9 |
|---|---|---|---|---|---|
| Performing Conditions | Running Direction of Reinforcing Fiber Sheet | Vertical (Downward) | Vertical (Downward) | Vertical (Downward) | Vertical (Downward) |
|  | Continuously Decreased Cross-sectional Area in Liquid Pool | Yes | Yes | Yes | Yes |
|  | Width of Outlet of Narrowed Section L2 (mm) | 306 | 306 | 306 | 306 |
|  | L2 - W (mm) | 6 | 6 | 6 | 6 |
|  | External Force Application Mechanism of Heat Bolt Type — Yes or No | Yes | Yes | Yes | Yes |
|  | Number of Mechanisms Mounted on One Face | 7 | 6 | 5 | 3 |
|  | Spacing between External Force Application Mechanisms (La) (mm) | 44 | 55 | 90 | 140 |
| Evaluation Items | Running Stability (Continuous Production Properties) | A | A | A | A |
|  | Width-directional Areal Weight | B | C | C | C | run. Then, the coating section 30 was dismantled, and the inside thereof was checked, revealing that the boundary 33 between the liquid pool 32 and the narrowed section 23 was clogged with a large amount of fuzz. The results are shown in Table 3. The liquid pool 32 in this Comparative Example did not contain a region whose cross-sectional area decreases continuously in the vertically downward direction Z, but the liquid pool 32 was configured such that the cross-sectional area decreases intermittently and suddenly at the boundary 33 with the narrowed section 23, and this is considered to have caused fuzz to get stuck and caused the reinforcing fiber sheet to be broken.

Comparative Example 3

A prepreg was produced and evaluated in the same manner as in Example 2 except that no external force application mechanism was used. The prepreg had no problem with the running stability, but caused a large difference in the areal weight in the width direction of the prepreg. The results are shown in Table 3.

TABLE 3

|  |  | Comparative Example 2 | Comparative Example 3 |
|---|---|---|---|
| Performing Conditions | Running Direction of Reinforcing Fiber Sheet | Vertical (Downward) | Vertical (Downward) |
|  | Continuously Decreased Cross-sectional Area in Liquid Pool | No | Yes |
|  | Width of Outlet of Narrowed Section L2 (mm) | 306 | 306 |
|  | L2 − W (mm) | 6 | 6 |
|  | External Force Application Mechanism of Heat Bolt Type — Yes or No | Yes | No |
|  | Number of Mechanisms Mounted on One Face | 15 | — |
|  | Spacing between External Force Application Mechanisms (La) (mm) | 20 | — |
| Evaluation Items | Running Stability (Continuous Production Properties) | D | B |
|  | Width-directional Areal Weight | — | D |

Examples 10 to 13

A prepreg was produced and evaluated in the same manner as in Example 2 except that the width of the outlet of the narrowed section was changed as in Table 4. At any level, it was possible to take a sample which was rated as usable or better. The results are shown in Table 4.

TABLE 4

|  |  | Example 2 | Example 10 | Example 11 | Example 12 | Example 13 |
|---|---|---|---|---|---|---|
| Performing Conditions | Running Direction of Reinforcing Fiber Sheet | Vertical (Downward) | Vertical (Downward) | Vertical (Downward) | Vertical (Downward) | Vertical (Downward) |
|  | Continuously Decreased Cross-sectional Area in Liquid Pool | Yes | Yes | Yes | Yes | Yes |
|  | Width of Outlet of Narrowed Section L2 (mm) | 306 | 310 | 320 | 310 | 305 |
|  | L2 − W (mm) | 6 | 10 | 20 | 10 | 5 |
|  | External Force Application Mechanism of Heat Bolt Type — Yes or No | Yes | Yes | Yes | Yes | Yes |
|  | Number of Mechanisms Mounted on One Face | 15 | 15 | 15 | 15 | 15 |
|  | Spacing between External Force Application Mechanisms (La) (mm) | 20 | 20 | 20 | 20 | 20 |
| Evaluation Items | Running Stability (Continuous Production Properties) | A | A | A | A | A |
|  | Folding of Fiber Bundle | A | B | C | B | A |
|  | Width-directional Areal Weight | A | A | A | A | A |

Example 14

Figure 22:
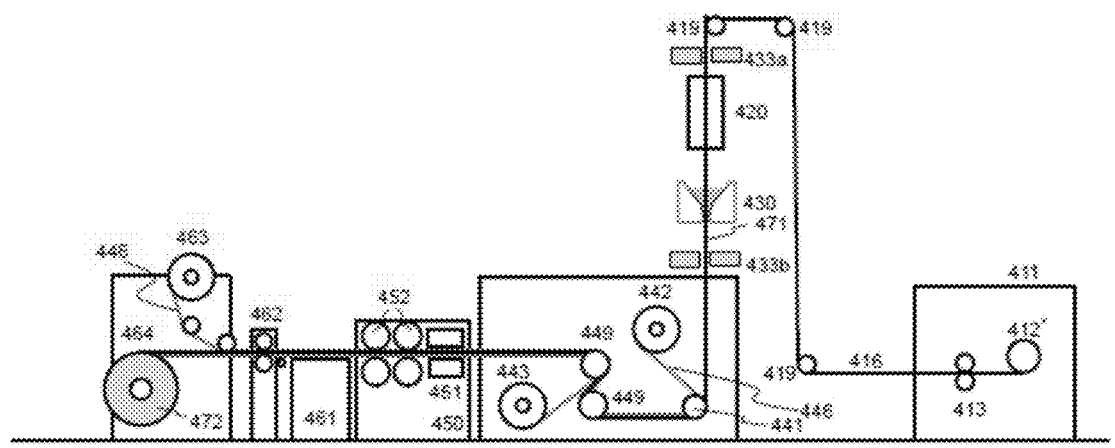
FIG. 22 is a schematic diagram according to a method of producing a prepreg in an embodiment other than in FIG. 1.

A prepreg was produced and evaluated in the same manner as in Example 2 except that an apparatus configured as depicted in FIG. 2, further including a thickness gauge, and in addition, enabled to unwind a reinforcing fiber fabric as a reinforcing fiber sheet (see FIG. 22) was used as an apparatus for producing a prepreg, that a carbon fiber woven fabric piece obtained by cutting the below-mentioned carbon fiber woven fabric to a width of 300 mm was used as a reinforcing fiber fabric, and that the gap D in the narrowed section 23 in the coating section was 0.3 mm. In this case, the aspect ratio of the outlet slit was 1020. The results are shown in Table 5. It was possible to take a sample which was rated as usable or better.

<Reinforcing Fiber Fabric>

Carbon fiber woven fabric ("TORAYCA (registered trademark)" cloth C6343B, manufactured by Toray Industries, Inc.)

Carbon fiber: TORAYCA T300B (3K)
Fabric structure: Plain weave
Warp density: 12.5 yarns/25 mm; weft density: 12.5 yarns/25 mm
Areal weight: 198 g/m$^2$; thickness: 0.23 mm

TABLE 5

| | | | Example 2 | Example 14 |
|---|---|---|---|---|
| Performing Conditions | Running Direction of Reinforcing Fiber Sheet | | Vertical (Downward) | Vertical (Downward) |
| | Reinforcing Fiber Sheet Used | | UD Base Material | Reinforcing Fiber Fabric |
| | Continuously Decreased Cross-sectional Area in Liquid Pool | | Yes | Yes |
| | Width of Outlet of Narrowed Section L2 (mm) | | 306 | 306 |
| | L2 – W (mm) | | 6 | 6 |
| | External Force Application Mechanism of Heat Bolt Type | Yes or No | Yes | Yes |
| | | Number of Mechanisms Mounted on One Face | 15 | 15 |
| | | Spacing between External Force Application Mechanisms (La) (mm) | 20 | 20 |
| Evaluation Items | Running Stability (Continuous Production Properties) | | A | A |
| | Width-directional Areal Weight | | A | A |

Examples 15 and 16

A sheet-like integrated object composed of a prepreg/release sheet having a width of 300 mm obtained in Example 2 and Example 3 was slit to obtain a prepreg tape having a width of 7 mm (a sample obtained from the prepreg of Example 2 was regarded as Example 15, and a sample obtained from the prepreg of Example 3 was regarded as Example 16). These prepreg tapes were impregnated sufficiently, and accordingly the resin sticking to the cutter blade of the slitter was a little.

Examples 17 to 20 and Reference Example 1

A prepreg obtained in Examples 2 to 5 was laminated in six layers, and the resulting laminate was cured using an autoclave at 180° C. at 6 kgf/cm$^2$ (0.588 MPa) for two hours to obtain a CFRP (a sample obtained from the prepreg of Example 2 was regarded as Example 17, a sample obtained from the prepreg of Example 3 was regarded as Example 18, a sample obtained from the prepreg of Example 4 was regarded as Example 19, and a sample obtained from the prepreg of Example 5 was regarded as Example 20). All the obtained CFRPs had a tensile strength in the range of from 2.8 GPa to 3.3 GPa, and had suitable mechanical properties as a structural material for the aerospace.

In addition, a prepreg was produced by a conventional hot-melt process using the carbon fiber and the coating liquid (matrix resin) used in Example 2. The produced prepreg was cured using an autoclave at 180° C. at 6 kgf/cm$^2$ (0.588 MPa) for two hours to obtain a CFRP. The obtained CFRP had a tensile strength of 2.93 GPa (Reference Example 1).

In this regard, the tensile strength of the CFRP was measured in the same manner as described in WO2011/118106, and the value resulting from normalizing the volume % of the reinforcing fibers in the prepreg to 56.5% was used.

INDUSTRIAL APPLICABILITY

The prepreg obtained by the production method according to the present invention can widely be applied as FRP typified by CFRP, in aerospace applications, applications for structural materials and interior materials such as for automobiles, trains, and ships, pressure vessels, industrial material applications, sports material applications, medical equipment applications, housing applications, civil engineering and construction applications, and the like.

REFERENCE SIGNS LIST

1 Reinforcing Fiber
2 Reinforcing Fiber Sheet
3 Prepreg
4 Matrix Resin
5*a*, 5*b* Release Sheet
11 Creel
12 Arrangement Device
13 Conveyance Roll
15 Take-up Roll
16*a*, 16*b* Release Sheet Supply Device
17 Wind-up Device
20 Coating Section 20a Coating Section in another embodiment
20b Coating Section in another embodiment
20c Coating Section in another embodiment
20d Coating Section in another embodiment
20e Coating Section in another embodiment
21, 21a, 21b Wall constituent members
21c, 21d Wall constituent members having another shape
21e, 21f Wall constituent members having another shape
21g, 21h Wall constituent members having another shape
21i, 21j Wall constituent members having another shape
22 Liquid Pool
22a Region whose cross-sectional area decreases continuously in Liquid Pool
22b Region whose cross-sectional area does not decrease in Liquid Pool
22c Region whose cross-sectional area decreases discontinuously and suddenly in Liquid Pool
23 Narrowed Section
24a, 24b Side Plate Members
25 Outlet
26 Gap
27, 27a, 27b Width Regulation Mechanism
28 Shim
30 Coating Section in Embodiment other than of Present Invention
31a, 31b Wall constituent members of Coating Section 30
32 Liquid Pool in Coating Section 30
33 Region whose cross-sectional area decreases discontinuously and suddenly in Liquid Pool in Coating Section 30
50 External Force Application Mechanism of Adjusting Bolt Type
50' External Force Application Mechanism of Heat Bolt Type
50a to 50f External Force Application Mechanism
51a, 51b Measurement Device
52a to 52f Measurement Device
53 Fixed Base
54 Adjusting Bolt
55 Rod
56 Heating Element
57 Cavity Portion
58 Heat Insulation Material
B Direction from Front to Back of Liquid Pool 22
D Gap of Narrowed Section
F Force in Direction Extending Gap D
F' External Force
G Position at which width regulation is carried out
H Vertical Height along which Cross-sectional Area Decreases Continuously in Liquid Pool 22
L Width of Liquid Pool 22
L2 Width Regulated by Width Regulation Mechanism at Bottom Ends of Width Regulation Mechanism
La Spacing between Adjacent External Force Application Mechanisms
M Thickness at Bottom End (on Outlet Side) of Wall constituent member
R, Ra, Rb Circular Stream in the Edge
T Circular Streams
W Width of Prepreg 3, as measured immediately under Narrowed Section 23
Y Width of Narrowed Section 23
Z Running Direction (Vertically Downward Direction) of Reinforcing Fiber Sheet 2
θ Opening Angle of Tapered Portion
411 Rack and Creel
412 Reinforcing Fiber Bobbin
412' Reinforcing Fiber Fabric Roll
413 Diverting Guide
414 Reinforcing Fiber
415 Reinforcing Fiber Arrangement Device
416 Reinforcing Fiber Sheet
419 Diverting Roll
420 Preheating Device
430 Coating Section
433a, 433b Thickness Gauge
441 Diverting Roll
442 Release Sheet (Upper) Supply Device
443 Release Sheet (Lower) Supply Device
446 Release Sheet
449 High Tension Take-up S-shaped Arranged Rolls
450 Additional-impregnation Device
451 Hot Plate
452 Heated Nip Roll
461 Cooling Device
462 Take-up Device
463 Release Sheet (Upper) Wind-up Device
464 Winder
471 Prepreg
472 Sheet-like Integrated Object Composed of Prepreg/Release Sheet

The invention claimed is:

1. A method of producing a prepreg, comprising allowing a reinforcing fiber sheet to pass vertically downward through a coating section to apply a coating liquid,
wherein said coating section includes:
a liquid pool storing said coating liquid and having a portion whose cross-sectional area decreases continuously and vertically downward, and
a narrowed section having a slit-like outlet in communication with a lower end of said liquid pool; and
wherein the coating liquid is applied by controlling a magnitude of an external force applied to wall constituent members in a thickness direction of said reinforcing fiber sheet,
wherein the magnitude of the external force is controlled by mass or thickness of the prepreg downstream of said coating section, and
wherein said wall constituent members are opposed to each other in the thickness direction of said reinforcing fiber sheet to form said narrowed section.

2. A method of producing a prepreg, comprising allowing a reinforcing fiber sheet to pass vertically downward through a coating section to apply a coating liquid,
wherein said coating section includes:
a liquid pool storing said coating liquid and having a portion whose cross-sectional area decreases continuously and vertically downward, and
a narrowed section having a slit-like outlet in communication with a lower end of said liquid pool; and
wherein a magnitude of an external force applied to wall constituent members in a thickness direction of said reinforcing fiber sheet is controlled by an amount of deformation of said wall constituent members,
wherein said wall constituent members are opposed to each other in the thickness direction of said reinforcing fiber sheet to form said narrowed section.

3. The method according to claim 1, wherein said external force applied to said wall constituent members in the thickness direction of said reinforcing fiber sheet is controlled using a thermal actuator.

4. The method according to claim 1, wherein said external force is applied to said wall constituent members at a plurality of positions as viewed in a direction corresponding to a width direction of said reinforcing fiber sheet.

5. The method according to claim 4, wherein spacing between adjacent positions among said plurality of positions is 150 mm or less.

6. The method according to claim 1, wherein said external force is applied to each of said wall constituent members opposed to each other.

7. The method according to claim 4, wherein the magnitude of said external force applied to said wall constituent members is controlled independently at each position at which said external force is applied.

8. The method according to claim 1, wherein said coating liquid comprises a thermosetting resin.

9. The method according to claim 1, wherein said coating liquid contains polymer particles, and said coating liquid is applied to said reinforcing fiber sheet, wherein temperature of said coating liquid in said coating section is 20° C. or more lower than the glass transition temperature (Tg) or melting temperature (Tm) of a resin of which said polymer particles are composed.

10. The method according to claim 1, wherein said reinforcing fiber sheet is heated and then introduced into said liquid pool.

11. The method according to claim 1, wherein said reinforcing fiber sheet is smoothed and then introduced into said liquid pool.

12. The method according to claim 1, wherein said reinforcing fiber sheet is widened and then introduced into said liquid pool.

13. A method of producing a sheet-like integrated object, comprising: applying a release sheet to at least one face of a prepreg obtained by the method according to claim 1, to form a sheet-like integrated object; and then taking up said sheet-like integrated object.

14. The method according to claim 13, comprising carrying out an additional-impregnation process after said sheet-like integrated object is formed.

* * * * *